United States Patent [19]

Rosen

[11] Patent Number: 4,856,383
[45] Date of Patent: Aug. 15, 1989

[54] COAST CLUTCH CONTROL FOR MULTIPLE SPEED AUTOMATIC TRANSMISSION

[75] Inventor: Stanley D. Rosen, Southfield, Mich.

[73] Assignee: Ford Motor Company, Dearborn, Mich.

[21] Appl. No.: 202,746

[22] Filed: Jun. 6, 1988

[51] Int. Cl.$^4$ .................. B60K 41/18; B60K 41/16
[52] U.S. Cl. .......................................... 74/869; 74/866
[58] Field of Search ................................ 74/869, 866

[56] References Cited

U.S. PATENT DOCUMENTS

| | | | |
|---|---|---|---|
| 3,393,585 | 7/1968 | Pierce | 74/864 |
| 3,613,484 | 10/1971 | Pierce et al. | 74/869 |
| 3,706,240 | 12/1972 | Borneman et al. | 74/869 |
| 3,714,836 | 2/1973 | Pierce et al. | 74/752 C |
| 4,346,627 | 8/1982 | Kawamoto et al. | 74/866 X |
| 4,367,528 | 1/1983 | Kawamoto et al. | 74/866 X |
| 4,485,695 | 12/1984 | Kawamoto | 74/869 |
| 4,776,240 | 10/1988 | Mike | 74/869 |

FOREIGN PATENT DOCUMENTS

| | | | |
|---|---|---|---|
| 0134656 | 10/1981 | Japan | 74/869 |
| 0223362 | 10/1986 | Japan | 74/869 |
| 0041454 | 2/1987 | Japan | 74/869 |

Primary Examiner—Dirk Wright
Attorney, Agent, or Firm—Frank G. McKenzie; Donald J. Harrington

[57] ABSTRACT

A manual valve alternately connects a source of regulated line pressure to a forward drive passage and to a reverse drive passage. A shift valve alternately connects these passages to an input port of a coast clutch valve in accordance with the state of a solenoid-operated valve. A control port of the coast clutch shift valve is pressurized either from a manual valve, when the gear is selected manually by the vehicle operator, or from the source of variable pressure control by operation of a variable force solenoid. In accordance with the control pressure, the coast clutch shift valve either connects its input to a line connected to the coast clutch or vents the input to a drain passage in the shift valve.

12 Claims, 7 Drawing Sheets

1st Gear In OD and D Ranges

2nd Gear In OD and D Ranges

3rd Gear OD Range

4th Gear OD Range

1st Gear Manual or 1 Range

2nd Gear Manual or 2 Range

3rd Gear Manual or D Range

Reverse

| SPEED/ RANGE | FRICTION ELEMENTS ||||||| ONE WAY CLUTCHES ||||||
| --- | --- | --- | --- | --- | --- | --- | --- | --- | --- | --- | --- | --- | --- |
| | C O A S T | I N T E R M E D | D I R E C T | F O R W A R D | R E V E R S E | O V E R D R I V E | B A N D | DRIVE ||| COAST |||
| | | | | | | | | OWC | OWC | OWB | OWC | OWC | OWB |
| | 72 CL1 | 96 B2 | 98 CL3 | 110 CL4 | 136 B5 | 74 B7 | 102 B8 | 92 | 94 | 146 | 92 | 94 | 146 |
| 1 Manual | X | | | X | X | | | | | | | | |
| 1 Automatic | | | | X | | | . | X | | X | O/R | | O/R |
| 2 Manual | X | X | | X | | | X | | O/R | | | | O/R |
| 2 Automatic | | X | | X | | | | X | X | O/R | O/R | O/R | O/R |
| 3 Manual | X | X | X | X | | | | | O/R | O/R | | O/R | O/R |
| 3 Automatic | | X | X | X | | | | X | O/R | O/R | O/R | O/R | O/R |
| 4 | | X | X | X | | X | | O/R | O/R | O/R | O/R | O/R | O/R |
| R | X | | X | | X | | | O/R | | | O/R | | |
X = Engaged    O/R = Overrunning

| PRND21 Position | Gear | Shift Control | | Converter Clutch Control Sol. 3 192 | Coast Clutch Control Sol. 4 194 | Coast Braking |
| --- | --- | --- | --- | --- | --- | --- |
| | | Sol. 1 188 | Sol. 2 190 | | | |
| OD | 4 | Off | Off | On/Off | Off | Yes |
| | 3 | ↓ | On | | ↓ | No |
| | 2 | On | ↓ | | ↓ | ↓ |
| | 1 | ↓ | Off | | ↓ | ↓ |
| OD (Cancel SW. On) | 3 | Off | On | | On | Yes |
| | 2 | On | ↓ | | ↓ | No |
| | 1 | ↓ | Off | | ↓ | ↓ |
| 2 | 2 | Off | Off | ↓ | On/Off | Yes |
| 1 | 1 | On | Off | Off | On/Off | Yes |
| P | P | ↓ | ↓ | | ↓ | No |
| N | N | ↓ | ↓ | | ↓ | No |
| R | R | On | Off | Off | Off | Yes |

FIG. 4.

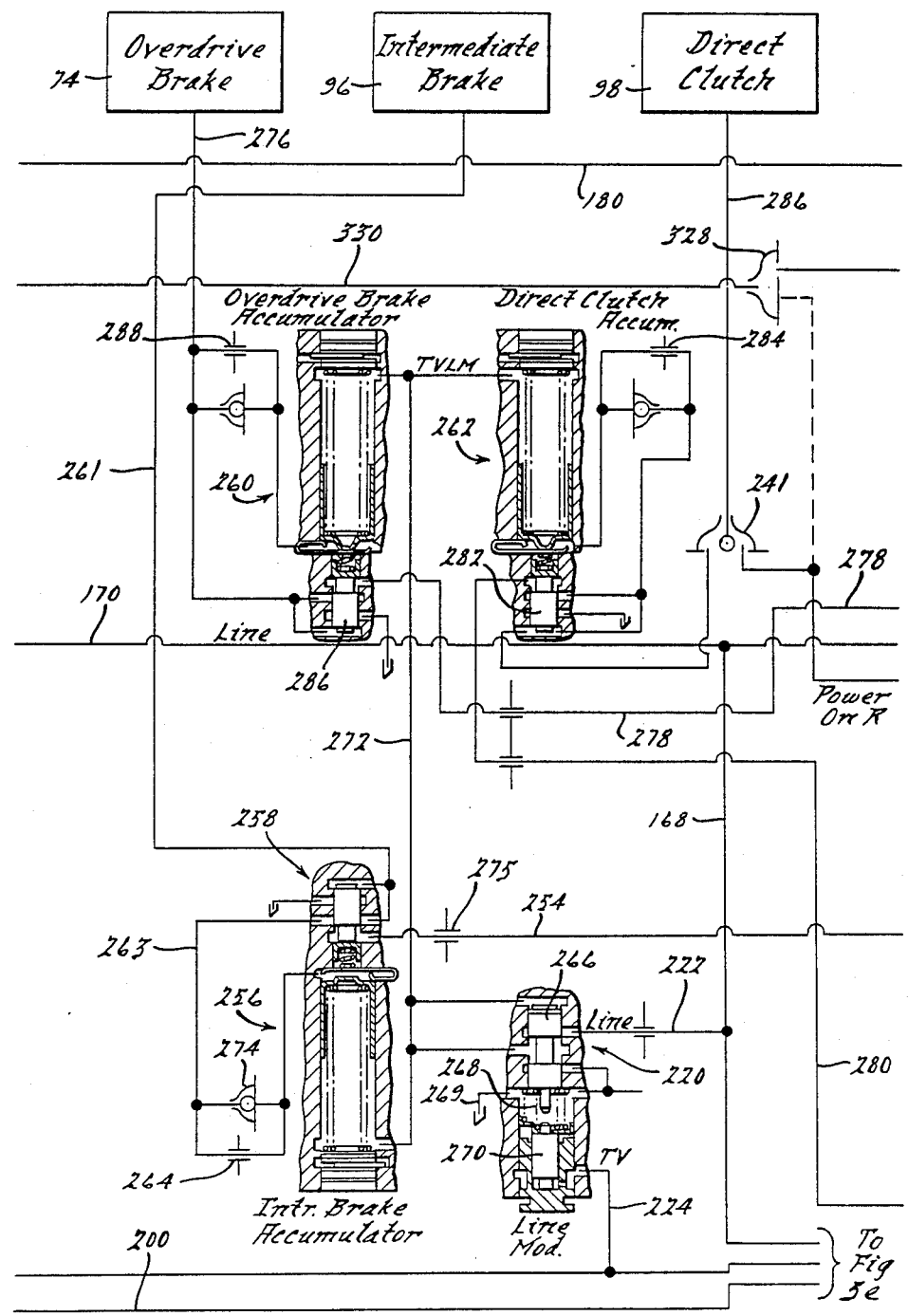

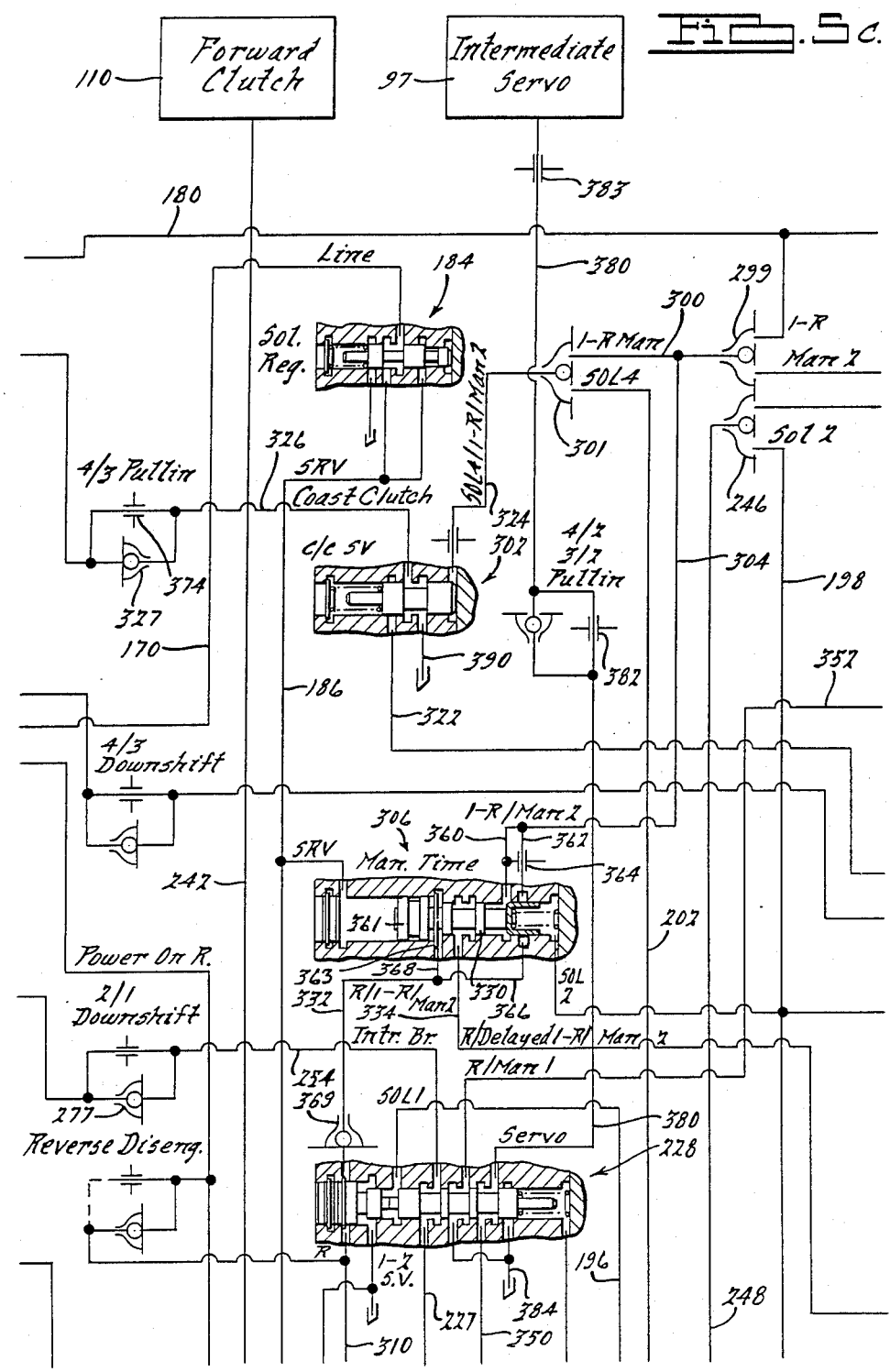

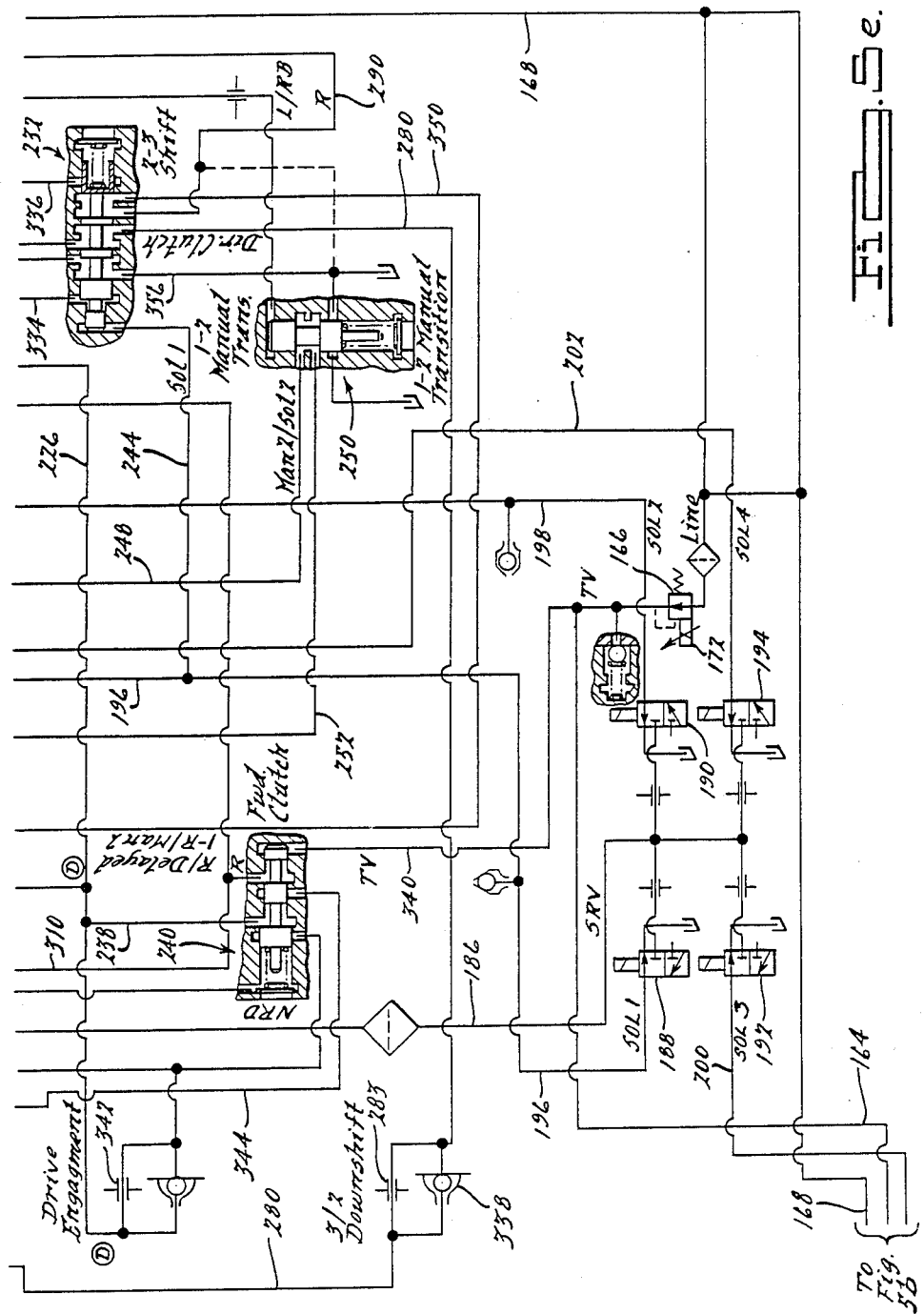

COAST CLUTCH CONTROL FOR MULTIPLE SPEED AUTOMATIC TRANSMISSION

BACKGROUND OF THE INVENTION

Our invention relates generally to automotive transmissions of the type disclosed in U.S. Pat. Nos. 3,393,585; 3,613,484; 3,706,240; 3,714,836; U.S. Ser. No. 24,500 filed Mar. 11, 1987 and now allowed and U.S. Ser. No. 927,624 filed Nov. 6, 1984 and now U.S. Pat. No. 4,744,269. All of these applications and patents are assigned to the assignee of this invention.

GENERAL DESCRIPTION OF THE INVENTION

The transmission of the present invention produces four forward speed ratios and a reverse speed ratio. The third speed is a direct drive ratio; the fourth speed is an overdrive ratio. The fourth or overdrive ratio is achieved by holding the sun gear of a first simple planetary gear unit and by driving a second gear unit from the output of the first gear unit while clutching together rotary elements of the second planetary gear unit so they rotate in unison. The three lowest forward speeds are produced by automatic shifts because a first overrunning clutch driveably connects rotary elements of the first gear unit without torque multiplication or speed reduction. The second and a third gear unit cooperate to produce torque multiplication through selective application of clutches and brakes, which driveably connect and hold elements of the later gear units.

In the lowest speed ratio produced by automatic shifts, a second overrunning clutch holds against rotation the carrier of the third gear unit. A third overrunning clutch completes a drivable connection between the sun gears of the second and third gear units and a brake, thereby holding against rotation these sun gears to produce the second speed ratio in the automatic mode.

Engine braking effect results by engaging a coast clutch in the first, second and third speed ratios when these ratios are selected manually. However, a band brake is applied during operation in the second speed manual mode to replace the effect of the second overrunning clutch and intermediate brake, which are operative when drive is from the engine to the wheels but inoperative when the drive is from the wheels to the engine. In this way, the inherently low torque capacity of the brake band is required only when torque levels are low, i.e., during coasting operation, but the intermediate brake and third overrunning clutch carry the higher torques during drive operation.

A manual valve alternately connects a source of regulated line pressure to a forward drive passage and to a reverse drive passage. A shift valve alternately connects these passages to an input port of a coast clutch valve in accordance with the state of a solenoid-operated valve. A control port of the coast clutch shift valve is pressurized either from a manual valve, when the gear is selected manually by the vehicle operator, or from a source of on-off pressure control by operation of a solenoid. In accordance with the control pressure, the coast clutch shift valve either connects its input to a line connected to the coast clutch or vents the input coast clutch to a drain passage in the shift valve.

BRIEF DESCRIPTION OF THE DRAWINGS

FIGS. 2a–2h are diagrams of the multiple-speed transmission showing in heavy lines the components that operate to produce each of the various speeds.

FIG. 3 is a table showing the engaged and disengaged states of hydraulic clutches and brakes and the driving and overrunning states of the overrunning clutches for each speed and range in which the transmission can operate.

FIG. 4 is a table showing the states of solenoid-operated shift valves, a converter clutch valve and coast clutch valve for each speed and range of the transmission.

FIGS. 5a–5e show a hydraulic control system capable of engaging and disengaging the hydraulic clutches and brakes of the transmission of FIG. 1. The lines connecting the hydraulic components are labeled alphanumerically to indicate the hydraulic pressures in the lines for each speed and range.

DESCRIPTION OF THE PREFERRED EMBODIMENT

1. Gear Units, Clutches and Brakes

Figure 1A:
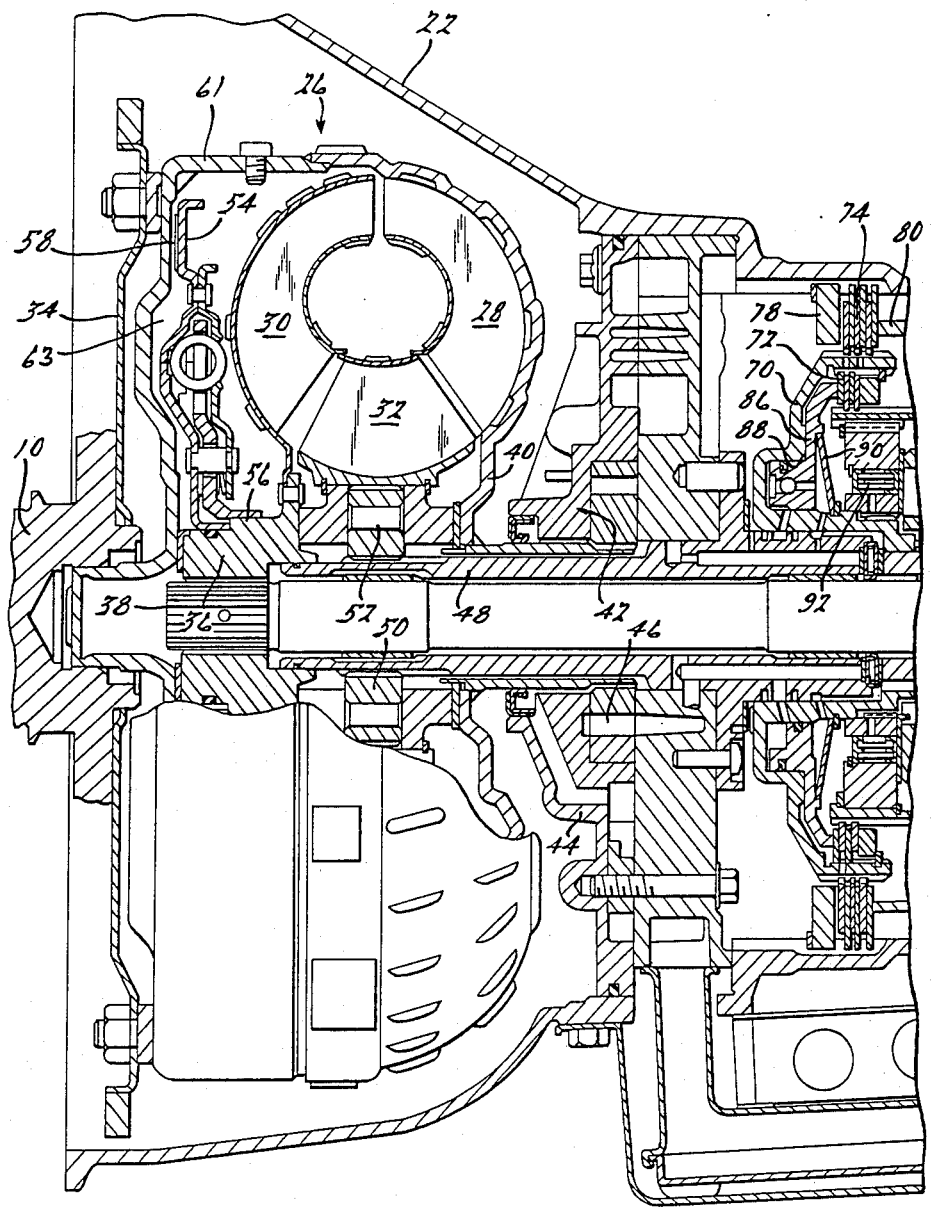
FIG. 1 is a cross section of a transmission according to this invention showing in the assembled condition a hydrokinetic torque converter, the clutches, brakes and gear units.
Figure 1B:
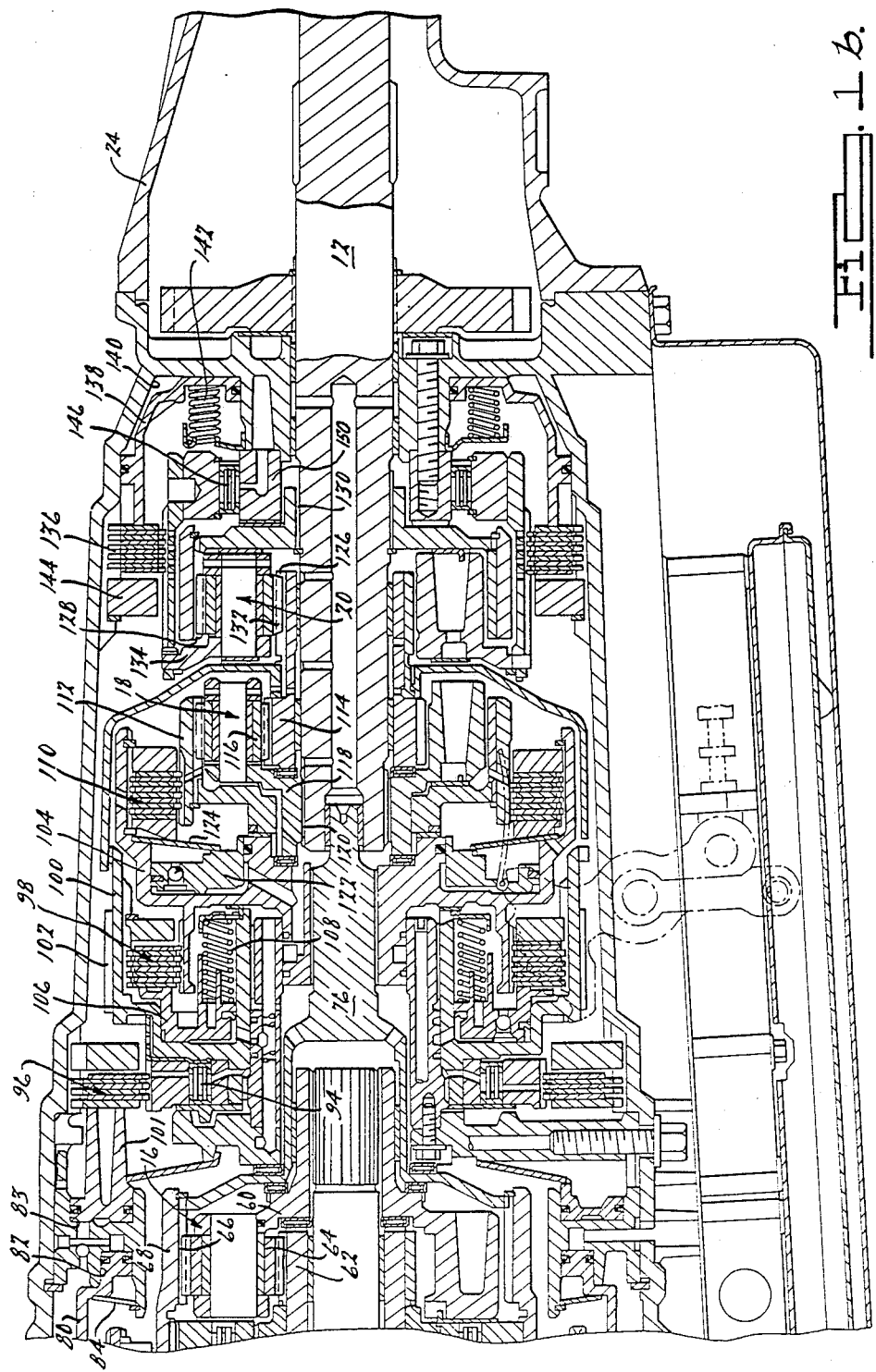

Referring first to FIG. 1, one end of an engine crankshaft 10 is driveably connected through the transmission to the power output tail shaft 12, which is adapted to be connected to the vehicle traction wheels through differential, driveline, and axle assemblies. The main transmission housing 22 encloses simple planetary gear units 16, 18, 20. Transmission housing 22 is bolted at its left-hand periphery to the cylinder block of an internal combustion engine and, at its right-hand end, to the left-hand end of tail shaft extension housing 24, which surrounds output shaft 12.

Transmission housing 22 encloses a hydrokinetic torque converter 26, which includes a bladed impeller 28, a bladed turbine 30 and a bladed stator 32. The impeller, the turbine and the stator are arranged in fluid flow relationship in a common toroidal circuit. The impeller includes a housing connected driveably to drive plate 34, which is bolted to the end of crankshaft 10. Turbine 30 includes a turbine hub 36 splined to turbine shaft 38. Impeller 28 is connected to impeller housing 40, which is journalled for rotation on a portion 42 of a pump housing, which closes converter housing 22. Pump housing 44 is bolted to housing 22 42 and encloses gear elements of a positive fixed displacement pump 46, which serves as of a pressure source for the control valve system to be described with reference to FIGS. 5a–5e. A stator sleeve shaft 48 extends from the pump housing 44 and supports the inner race 50 of a one-way clutch 52 whose outer race supports stator 32.

A torque converter lockup clutch 54 is splined at 56 to the turbine hub 36 and carries a friction surface 58, located at its radially outer end, to driveably engage the torque converter cover 61, welded to the impeller housing. Lockup clutch 54 is closed, locked, applied or engaged to complete a mechanical connection between the impeller and turbine when pressurized hydraulic fluid, contained in the torque converter casing, forces friction surface 58 against the housing. The torque converter is opened, unlocked, released or disengaged so that a hydrodynamic driving connection exists between the impeller and turbine when pressurized hydraulic fluid is supplied through passage 63 between converter cover 61 and friction surface 58 of the lockup clutch to disengage these surfaces.

Turbine shaft 38 is splined at 58 to the carrier 60 of the first planetary gearset 16, which includes sun gear 62, a set of planetary pinions 64 rotatably supported on carrier 60 and ring gear 66. Sun gear 62 is driveably connected to a member 70 that is common to a coast clutch 72 and an overdrive brake 74. Ring gear 66 is driveably fixed to a drum portion 68 connected to intermediate shaft 76.

Overdrive brake 74 includes a set of clutch discs fixed to housing 22, a load block 78 fixed to housing 22, a set of clutch discs driveably connected to the outer surface of clutch member 70 and interposed between the discs affixed to the housing, a clutch piston 80 displaceable hydraulically against the clutch disc assembly and hydraulic cylinder 82 containing piston 80, and a Belleville spring 84 for returning piston 80 to the inactive position when hydraulic pressure is removed from cylinder 82.

Coast clutch 72 includes a set of clutch discs driveably connected to the inner surface of clutch member 70, a load block connected to the inner surface of clutch member 70, a second set of clutch discs driveably fixed to ring gear 66, piston 86 actuated hydraulically to engage the coast clutch disc sets, a hydraulic cylinder 88 within which piston 86 moves, and a Belleville spring 90 to return piston 86 to the disengaged position when hydraulic pressure is removed from cylinder 88.

A first one-way clutch 92 has its outer race driveably connected to ring gear 66, its inner race driveably connected by a spline to cylinder 88 and to sun gear 62 and a driving member located in the annulus between the inner and outer races for producing a one-way driving connection therebetween. A second one-way clutch 94 is located between intermediate brake 96 and direct clutch 98. One-way clutch 94 includes an outer race that carries a set of brake discs for the intermediate brake 96, an inner race driveably fixed to drum 100, and a driving member located in the annular region between the inner and outer races for producing a one-way drive connection therebetween.

Intermediate brake 96 includes a second set of brake discs fixed to housing 22, a load block fixed to the housing, a piston 101 actuated hydraulically to force the brake disc sets into drivable relationship against the load block, hydraulic cylinder 83 within which piston 101 moves and a Belleville spring.

Drum 100 is stopped and held against the transmission casing through the action of an intermediate brake band 102 actuated by a hydraulic intermediate servo. Direct clutch 98 operates to produce a drive connection between drum 100 and clutch member 104. The direct clutch includes a first set of clutch discs splined to the inner surface of drum 100 and second set of clutch discs connected to clutch member 104, and interposed between successive members of the first clutch disc set. A piston 106 moves within a hydraulic cylinder to force the clutch disc sets into drivable connection against the load block that is carried on the inner surface of the drum 100. Piston 106 moves within the hydraulic cylinder defined by drum 100 and is restored to its disengaged position through operation of a coil compression spring 108.

Forward clutch 110 operates to produce a driving connection between clutch member 104 and the ring gear 112 of the second planetary gearset 18. This gearset includes a sun gear 114, a set of planetary pinions 116 in continual meshing engagement with sun gear 114 and ring gear 112, rotatably supported on a carrier 118 which is driveably connected by spline 120 to the tail shaft 12.

Forward clutch 110 includes a first set of clutch discs driveably connected to the inner surface of clutch member 104 and a second set of clutch discs, each interposed with discs of the first set, driveably connected to the outer surface of ring gear 112. Piston 122 is hydraulically actuated for movement within the cylinder defined by clutch member 104 to force the clutch discs into a drivable connection. Belleville spring 124 returns piston 122 to the disengaged position when hydraulic pressure is removed from the clutch cylinder.

The third planetary gearset 20 includes sun gear 126 formed integrally with sun gear 14, ring gear 128 connected by spline 130 to tail shaft 12, a set of planet pinions 132 rotatably supported on carrier 134, which is driveably connected to a first set of brake discs of the low-and-reverse brake 136. A second set of brake discs of brake 136 is fixed to transmission casing 22; each disc of the second set is interposed between successive discs of the first disc set of brake 136. Brake piston 138 is actuated hydraulically when cylinder 140 is pressurized to force the piston against the first and second brake disc sets and to produce a drivable connection therebetween against the effect of the return spring 142, which forces piston 138 to the brake disengaged position when cylinder 140 is vented. Load block 144, fixed to the transmission casing reacts the force applied by piston 138 to the disc brake sets.

A third one-way clutch 146 includes an outer race pinned to carrier 134, an inner race 150 bolted to the transmission casing 22, and a driving member located in the annular region between the inner and outer races to produce a one-way drive connection between carrier 134 and the casing.

The transmission produces four forward gear ratios and a reverse gear. The three lowest of the forward gear ratios is produced both automatically and by manual operation of the gear selector lever by the vehicle operator. The third forward gear ratio directly connects the engine crankshaft 10 to tail shaft 12, and the fourth forward ratio is an overdrive ratio. When the gear selection is made manually by the vehicle operator, the three lowest forward gear ratios and the reverse drive involve the engagement of coast clutch 72, and through its operation, the engine braking effect is transmitted through the transmission to the tail shaft 12. FIG. 3 shows engaged and release conditions of the clutches and brakes and driving and overrunning conditions of the one-way clutches for each of the gears and ranges of the transmission.

The gear selector lever includes a PRND21 switch, which produces an electrical signal, preferably a voltage, whose magnitudes represent each of the PRND21 positions. The gear selector and the manual valve it controls can be moved among the following alphanumeric positions from leftmost to rightmost: P for park, R for reverse, N for neutral, D for overdrive, 2 for manually selected second gear, and 1 for manually selected first gear. When the gear selector is in the D position and an overdrive cancel button is depressed, a mechanically selected condition called "drive" range, the transmission will produce only the three lowest gears. When the button is released, and the selector is in the OD position, a condition called "overdrive" range, the transmission can produce four forward gears. When the gear selector is moved to the manual 1 or 2 positions, the transmission produces only the first or second gear ratios, respectively.

Coast clutch 72 produces engine braking in third gear when the gear selector is in "drive". Otherwise, the transmission would freewheel in third gear while the vehicle is coasting. When overdrive range is selected, coast clutch 72 is disengaged hydraulically but engine braking results in fourth gear through operation of overdrive brake 74. When manual 2 and manual 1 are selected, the coast clutch is applied hydraulically through operation of a coast clutch shift valve 302; whereas, when drive is selected, the coast clutch shift valve is actuated through operation of a solenoid-actuated coast clutch valve controlled by programmed logic. A manually initiated shift from fourth gear to third gear or second gear causes a short delay to allow overdrive clutch 74 to release fully before coast clutch 72 engages.

To prevent intermediate band 102 from absorbing excessive driveline energy in the manual 2 and manual 1 ranges, application of band 102 is delayed until the coast clutch engagement is inferred by expiration of a shift-in-progress timer.

The torque flow in each gear and range is described next with reference to FIGS. 2a-2h.

Figure 2A:
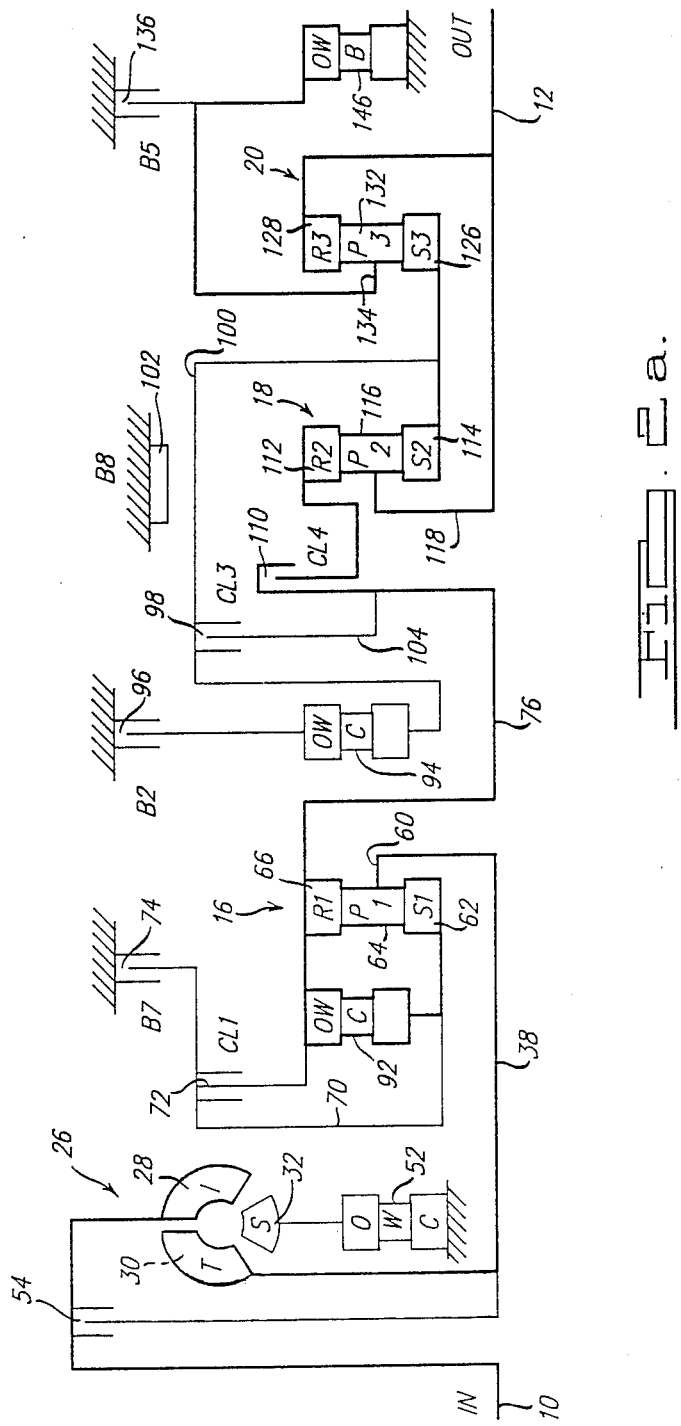

First Gear-Overdrive and Drive Ranges-FIG. 2a

Low speed forward drive acceleration in the automatic mode is obtained by engaging forward clutch 110. Torque then is delivered from turbine shaft 38 to carrier 60 of the first gearset 16. One-way clutch 92 driveably connects ring gear 66 and sun gear 62 so that the entire gearset 16 turns as a unit and drives intermediate shaft 76. Torque is then delivered from intermediate shaft 76 to the ring gear 112 through engaged forward clutch 110, thus imparting a driving torque to carrier 118 and the power output shaft 12. The reaction torque on sun gears 114, 126 is in a reverse direction. This causes a forward driving torque on ring gear 128, which is transferred to the output shaft 12 because carrier 134 acts as a reaction member. Carrier 134 is held against rotation in this instance by overrunning brake 146.

In coasting operation, i.e. when torque flow is from output shaft 12 toward shaft 38, OWB 146 overruns so that there is no torque path to the torque converter.

First Gear Manual or 1 Range - FIG. 2e

The vehicle operator selects low speed operation manually by moving the gear selector lever to the 1 position. In this range, forward clutch 110, reverse-low brake 136 and coast clutch 72 are engaged, but converter lockup clutch 54 is always disengaged. Clutch 72 connects ring gear 66 and sun gear 62, so gearset 16 again turns as a unit and drives shaft 76. Shaft 76 drives clutch 110, which drives ring gear 112 and carrier 118. Brake 136 provides the reaction by holding carrier 134 against rotation.

In coasting operation, the torque flow is from shaft 12 to shaft 76. A drive connection to engine shaft 10 for engine braking effect is completed from shaft 76 by coast clutch 72 and torque converter 26. Clutch 72 is applied with the logic of the hydraulic circuit of FIGS. 5a-5e.

Figure 2B:
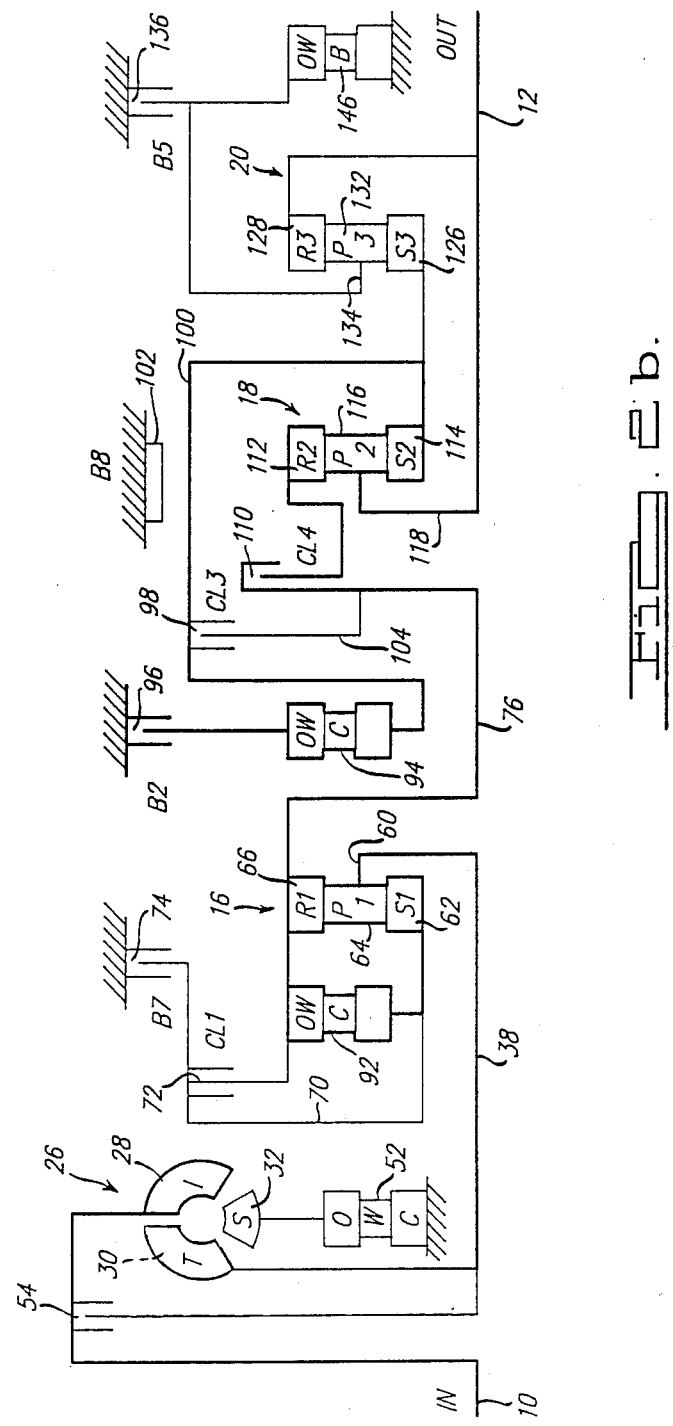

Second Gear-Overdrive and Drive Ranges - FIG. 2b

Second speed ratio acceleration is achieved automatically by maintaining the first gear status of the friction elements and by engaging intermediate brake 96. This holds sun gears 114, 126 against rotation because overrunning clutch 94 driveably connects brake 96 to drum 100. Powerflow from the engine to ring gear 112 is the same as that for the first speed overdrive and drive ranges. Planet pinions 116 are driven by ring gear 112 and rotate with carrier 118 about sun gear 114. Ring gear 112 continues to act as a power input element and carrier 118 continues to drive the output shaft 12. Overrunning brake 146 free wheels so that all of the torque multiplication is accomplished by gearset 18.

During coasting, shaft 12 drives carrier 118 and pinion 116. Ring gear 112 and clutch 110 rotating at engine speed cause OWC 94 to free wheel in the coast direction, so the torque path ends there.

Figure 2C:
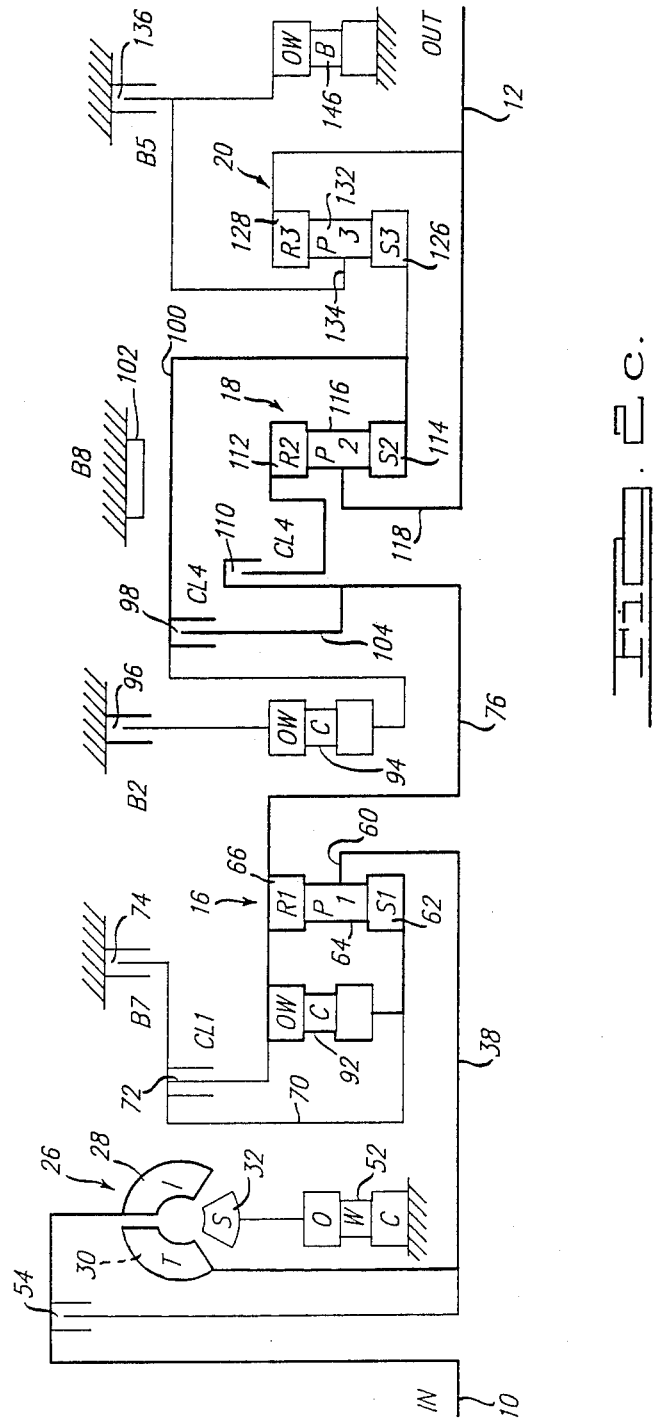
Figure 2D:
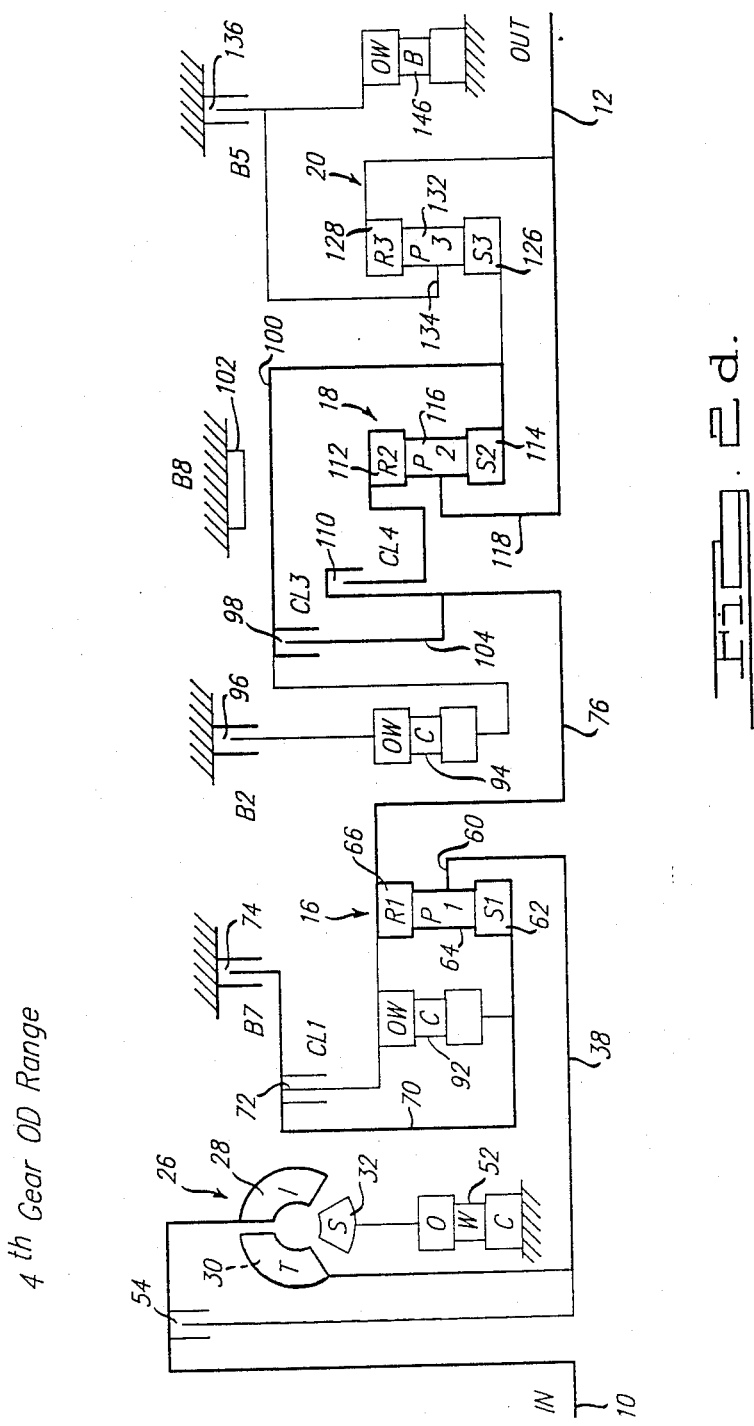
Figure 7E:
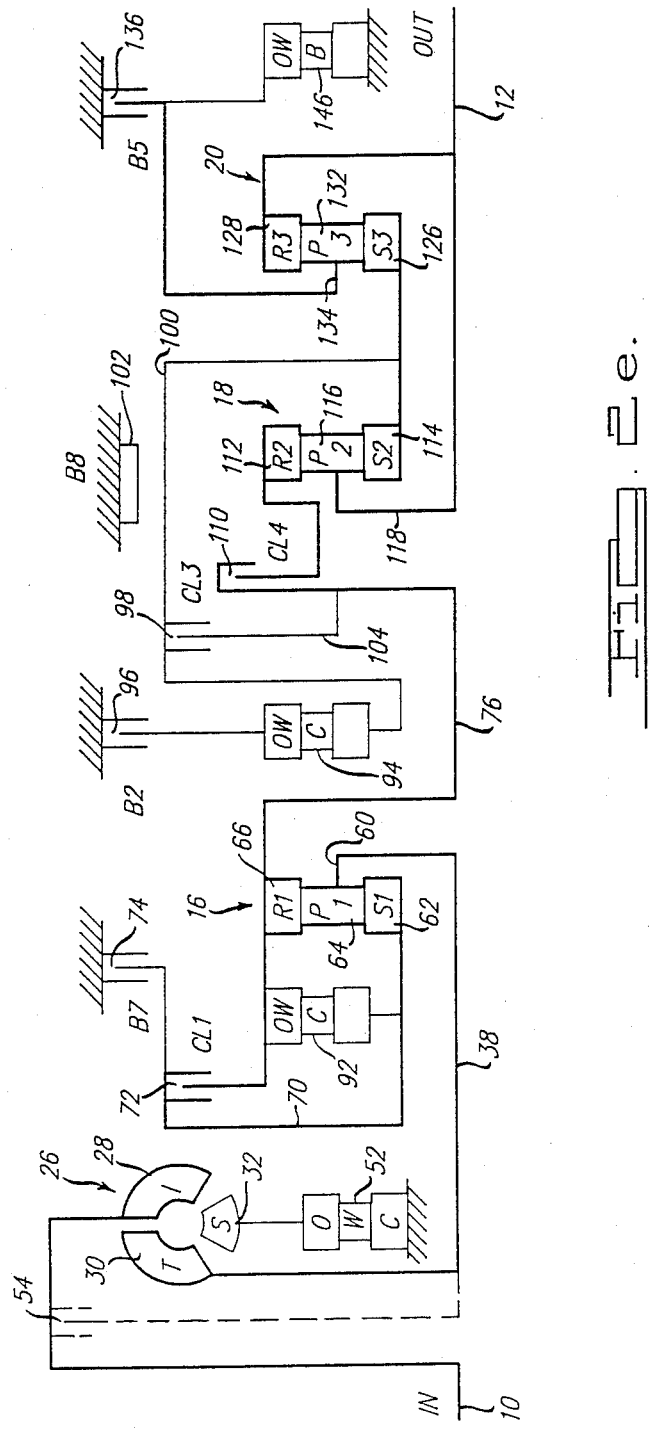
Figure 2F:
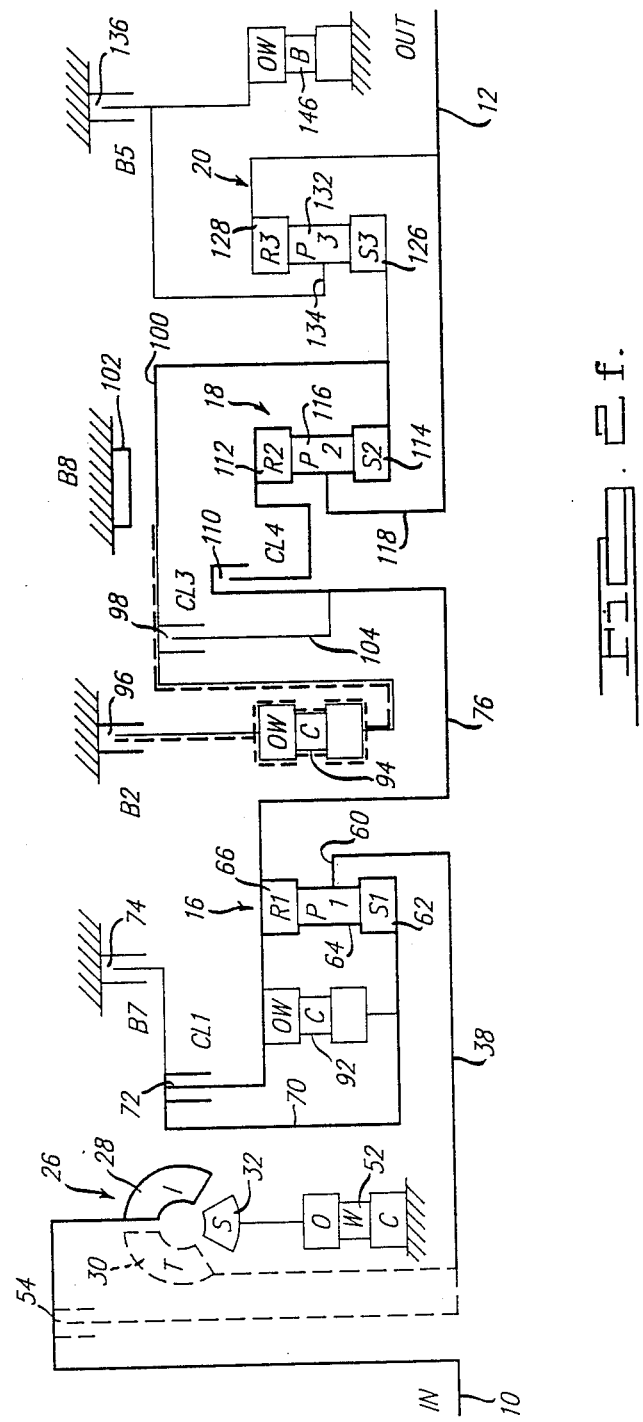
Figure 9:
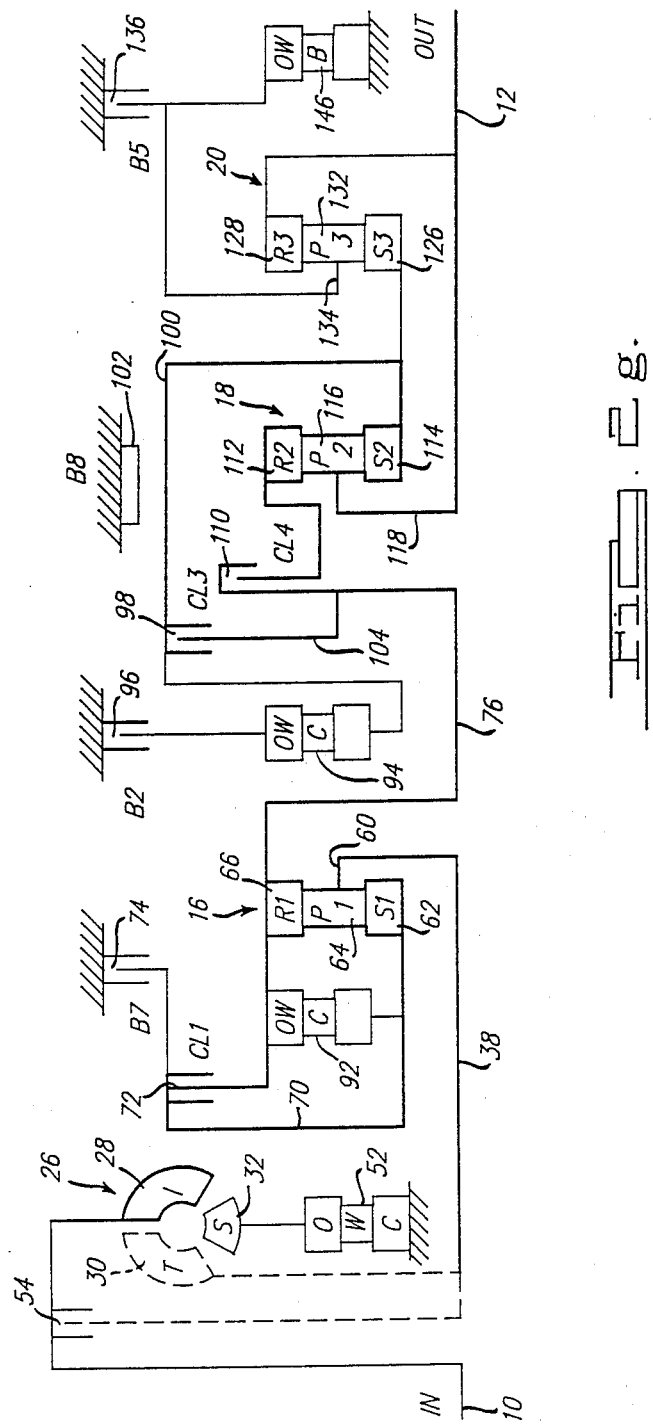

Second Gear Manual or 2 Range - FIG. 2f

In the manually selected second speed,,d the following friction elements are engaged: coast clutch 72, intermediate brake 96, forward clutch 110 and intermediate band 102. In driven operation, clutch 72 connects ring gear 66 and sun gear 62, so gearset 16 turns as a unit and drives shaft 76. Shaft 76 drives ring gear 112 through clutch 110. Overrunning clutch 94 driveably connects sun gears 114, 126 to intermediate brake 96, which holds sun gear 114; Therefore, pinions 116 are driven by ring gear 112 and rotate with carrier 118 about sun gear 114. Brake 96 is engaged before band 102 is applied, as will be explained below, so full engine torque is not carried solely by band 102 but is stored with brake 96.

In coasting operation, clutch 94 overruns and shaft 12 drives carrier 118 and pinions 116 about sun gear 114, which is held by band 102. Ring gear 112 drives shaft 76 and ring gear 66 through forward clutch 110. Gearset 16 turns as a unit because coast clutch 72 connects ring gear 66 to sun gear 62. Therefore, pinions 64 and carrier 60 drive shaft 38, which is connected by the converter 26, or by converter clutch 54, to engine shaft 10.

Third Gear-Overdrive Range - FIG. 2c

While accelerating in the overdrive range, third gear ratio results by maintaining forward clutch 110 and intermediate brake 96 engaged and by engaging direct clutch 98. When the engine drives output shaft 12, overrunning brake 146 and overrunning clutch 94 freewheel, but one-way clutch 92 drives. Shaft 76 and input shaft 38 turn at the same speed. One-way clutch 92 driveably connects ring gear 66 and sun gear 62 so that turbine shaft 38 is driveably connected by the first gearset 16 to intermediate shaft 76. Direct clutch 98 and forward clutch 110 driveably connect ring gear 112, sun gears 114, 126 and intermediate shaft 76, which rotate as a unit. Planet pinion set 116, carrier 118 and output shaft 12 are driven at the speed of the turbine shaft because of the connection between ring gear 112 and sun gear 114. Overrunning brake 146 free wheels. When the vehicle coasts, OWC 92 freewheels; therefore, ring gear 66 and sun gear 62 are disconnected and no engine braking effect occurs.

Third Gear Manual or Drive Range FIG. 2g

When the overdrive cancel switch is closed on the gear selector to place the transmission in the drive range, the friction elements operate as they do to produce third gear in the overdrive range except that coast clutch 72 is engaged. The transmission produces a direct connection between input shaft 38 and output shaft 12, as in third gear overdrive, except that clutch 72 connects ring gear 66 and sun gear 62 instead of OWC 92.

When the vehicle coasts, clutch 72 remains engaged, gearset 16 driveably connects shafts 76 and 38, and the torque converter connects shaft 38 to engine shaft 10.

Fourth Gear Overdrive Range FIG. 2d

The fourth gear ratio is achieved by maintaining forward clutch 110, direct clutch 98 and intermediate brake 96 engaged and by engaging overdrive brake 74. Sun gear 62 of gearset 16 is held against rotation by brake 74 and one-way clutch 92 freewheels due to the engagement of overdrive brake. In this instance, ring gear 66 and intermediate shaft 76 are driven at a higher speed than turbine shaft 38 and carrier 60. Gearsets 18 and 20 are disposed in the same condition as they were for the third gear ratio in the automatic mode; therefore, the speed of the output shaft 12 is the same as the speed of the intermediate shaft 76.

In coasting operation, overdrive brake 74 remains engaged and the torque path from output shaft 12 to engine shaft 10 is completed by gearset 16 and the torque converter. Engine braking is therefore operative.

Figure 2H:
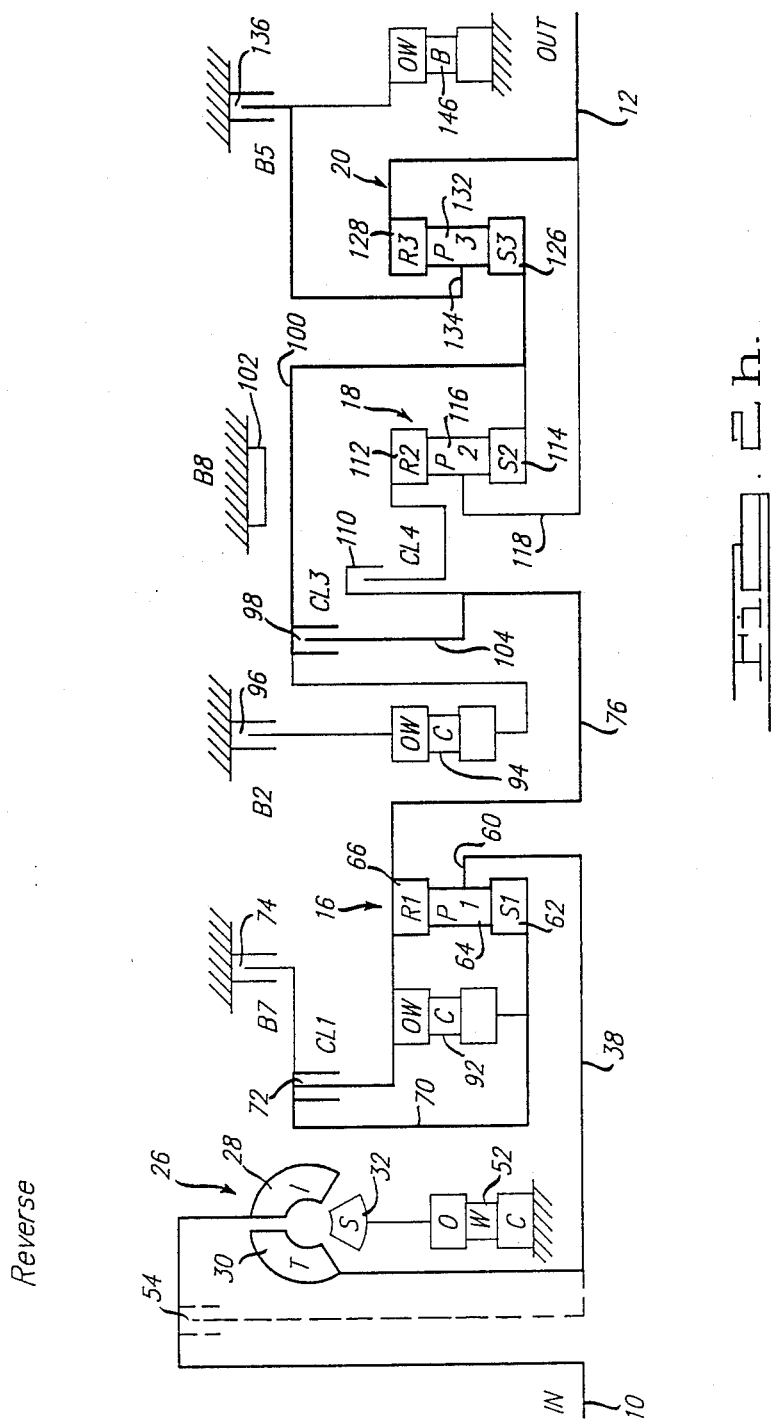

Reverse Gear FIG. 2h

Reverse drive is achieved by releasing intermediate brake 96, forward clutch 110 and overdrive brake 74 and by applying low and reverse brake 136, direct clutch 98, and coast clutch 72. With the friction elements so disposed, one-way clutch 94 free wheels, one-way clutch 92 is inactive and one-way brake 146 is inactive. Coast clutch 72 driveably connects sun gear 62 and ring gear 66 of the first gearset 16 so that turbine torque is delivered from shaft 38 directly to sun gears 114, 126. With carrier 134 acting as a reaction point, ring gear 128 and power output shaft 12 are driven in a reverse direction.

The transmission will produce upshifts and downshifts among the three lowest gear ratios in the drive range, and among all four gear ratios in the overdrive range. Engine braking occurs in the highest gear available in each range, i.e., 1, 2, drive and overdriven. The schedule of FIG. 4 shows the status of the coast clutch solenoid in each gear of each range and the availability of engine braking.

2. Hydraulic Circuit

FIG. 5a through 5e show the hydraulic control valve system that controls application and release of the hydraulic clutches and brakes of the change-speed gear box of FIGS. 1 and 2. The various passages are pressurized in accordance with selected positions of a manual valve 160, moved manually by the vehicle operator among six positions P, R, N, OD, 2 and 1, and states of certain solenoid-operated valves as determined by microprocessor execution of control algorithms.

Fluid required for the operation of the hydraulic control valve system is supplied at the output of a hydraulic pump, which is supplied from the sump or reservoir of the transmission through a filter or from a return line connected to the inlet of the pump. The pump may be a fixed displacement pump that produces a flow rate proportional to its speed.

Line Pressure Regulation

Figure 5A:
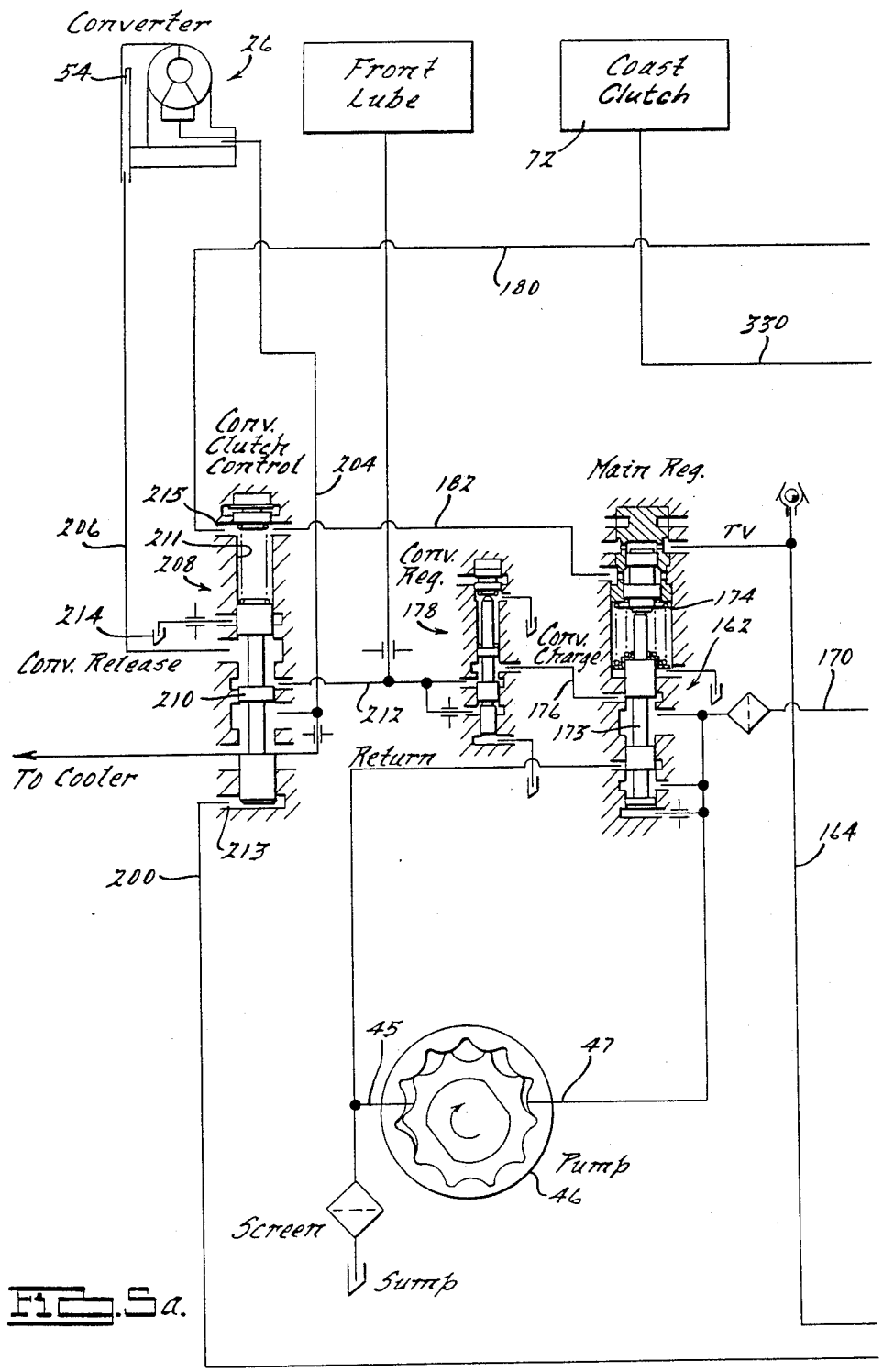

Line pressure magnitude is controlled by main regulator valve 162 shown in FIG. 5a. This valve operates in response to control pressure carried in line 164 from TV pressure valve 166. Valve 166 is connected by passages 168 and 170 from regulated line pressure produced by main regulator valve 162. A variable force solenoid 172 regulates TV pressure by having applied across its winding an electrical voltage duty cycle in accordance with the control of the microprocessor output. Hydraulic pressure having a magnitude between 5 psi and 85 psi produced by valve 166 is applied to the end of line regulator valve 162. When there is demand for a high volume of fluid at line pressure, spool 172 moves downward due to TV pressure operating against the effect of a set of coil springs 174, closes the return line to the suction side of the pump, and closes torque converter charge line 176. Then substantially the entire volumetric flow of the pump is carried in passage 170.

The magnitude of pressure in line 170 is a result of upwardly directed differential pressure on the lower end of spool 172 acting against the spring forces and a TV pressure force directed downward on the spool. When line pressure is high in relation to TV pressure, spool 172 moves upward and opens the feedback line to the suction side of the pump. Before this occurs, however, line 176 to converter regulator valve 178 is opened. Thus, line pressure is regulated by balancing the spring forces and TV pressure against line pressure in passage 170.

When manual valve 160 is moved to the 1 and R positions, line pressure is carried in passages 180, 182 to a differential pressure area of the main regulator valve. The pressure developed on the differential area operates to force spool 172 downward so that line pressure is higher when the reverse and 1 ranges are selected than for any of the other settings of the gear selector and manual valve. Higher line pressure in these ranges increases the torque capacity of the clutches and brakes engaged to produce the first gear and reverse drive while engine torque is near its peak magnitude.

Solenoid-Operated Valves

Passage 170 carries line pressure to solenoid regulator valve 184, which produces a regulated solenoid feed pressure carried in passage 186 to first and second solenoid-operated shift valves 188, 190, a converter clutch solenoid-operated valve 192, and coast clutch solenoid-operated feed valve 194. Regulator valve 184 maintains the output in line 186 at approximately 50 psi by balancing spring force applied to the spool against an opposing line pressure force on the spool end resulting from feedback output.

VAaves 188, 190, 192 and 194 are on-off valves that alternately connect and disconnect line 186 and output lines 196, 198, 200 and 202, respectively. The solenoids that operate these valves are controlled by the output of the microprocessor, which selectively energizes and deenergizes the solenoids in accordance with the result of executing electronically stored algorithms accessible to the microprocessor. For example, when the solenoid of valve 188 is deenergized, line 196 is vented by being connected to the low pressure sump. But when the solenoid is energized solenoid feedline 186 is connected to line 196. Similarly, valves 190, 192 and 194 either connect solenoid feedline 186 to lines 198, 200, 202 or vent these lines in accordance with the state of the corresponding solenoids.

Converter Clutch

Converter clutch 54 is engaged to lock torque converter 26 by pressurizing line 204 and venting line 206.

The converter clutch is disengaged and the torque converter opened when line 206 is pressurized and line 204 is vented. Converter clutch control valve 208 moves upward within the valve body due to a force on spool 210 resulting from converter clutch solenoid pressure carried in line 200. Valve 208 is forced downward by the helical spring and a pressure force resulting from 1-R pressure carried in line 180 to the upper end of spool 210. Also, control valve 208 is supplied through line 212 with regulated converter feed pressure from converter regulator valve 178, which regulates converter feed pressure in line 212 by sensing the pressure in line 212 and throttling converter charge pressure in line 176. When converter clutch solenoid valve 192 is energized, line 200 is pressurized, and spool 210 moves upward against the force of the spring to connect lines 212 and 204. When this occurs, line 206 is connected by valve 208 to vent port 214 and converter clutch 54 is engaged.

When solenoid valve 192 is deenergized, line 200 is vented causing spool 210 to move downward, closing the connection between lines 212 and 204, closing the connection of line 206 to vent 214, and opening a connection between lines 212 and 206. This vents line 204 through valve 208 and a hydraulic fluid cooler to the sump of the transmission. This action opens the torque converter by disengaging the mechanical connection of impeller 28 and turbine 30 made through clutch 54. The 1-R pressure, in addition to increasing line pressure for a given TV pressure, as described with respect to the operation of valve 162, also operates to open the torque converter if solenoid valve 192 remains open while the gear selector is moved to the 1 or R positions, perhaps due to failure of the solenoid that operates valve 192, a short circuit or other electrical fault. This 1-R pressure assures the torque converter will be open if the gear selector is located in the R and 1 positions so that the torque multiplication effect of the converter is available to maximize torque to output shaft 12. Converter regulator valve 178 limits torque converter feed pressure to approximately 110 psi.

Line modulator valve 220 is connected to regulated line pressure by passages 170, 168 and 222, and to TV pressure by passages 164 and 224.

Automatic Forward Drive

Figure 5D:
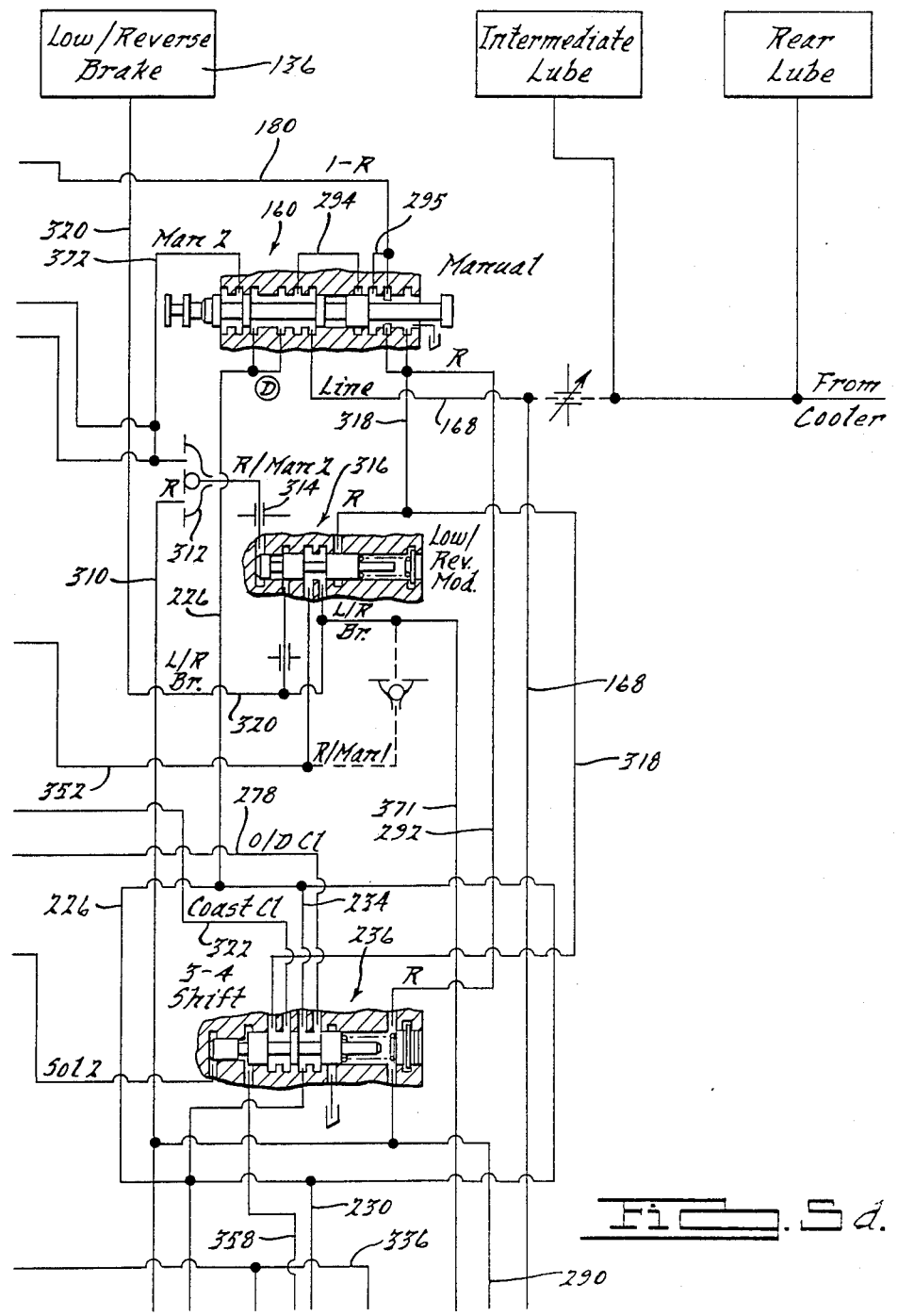

Regardless of whether the OD cancel button is depressed on the gear selector mechanism, whenever manual valve 160 is moved to the OD position, the position shown in FIG. 5d, regulated line pressure in passage 168 is connected through valve 160 to passage 226. Forward clutch 110 is continually connected to regulated line pressure through passage 226, orifice 342 and passage 242; provided the manual valve is in a forward drive position. First gear results for automatic shifting when the forward clutch alone is engaged in this way.

In the OD range and with the transmission operating in first gear, first solenoid shift valve 188 directs SOL1 pressure to 1-2 shift valve 228 through passage 196 and to 2-3 shift valve 232 through passage 244, but second solenoid shaft valve 190 is exhausted. Therefore, shift valves 228 and 232 are moved by SOL1 pressure to the rightward extremity, closing line pressure passages 227 and 230, respectively. In this way only forward clutch 110 is pressurized and first gear operation results.

An upshift to second gear occurs while first solenoid shift valve 188 remains open and after second solenoid shift valve 190 is opened. Valve 190 directs SOL2 pressure through passage 198 to the end of 3-4 shift valve 236 and to manual timing valve 306. Passage 198 also directs SOL2 pressure to shuttle valve 246. If passage 372 is not pressurized, valve 246 directs SOL2 pressure to manual transition valve 250. If L/R clutch pressure passage 370 is not pressurized, transition valve 250 directs SOL2 pressure to the spring end of 1-2 shift valve 228. The 1-2 shift valve is moved leftward by SOL2 pressure, thereby opening the connection between passages 227 and 254, through which regulated line pressure is carried to intermediate brake accumulator 256.

Line Modulator and Accumulator

Line modulator valve 220 and accumulator 256 work cooperatively to supply pressurized fluid to intermediate brake 96 thereby engaging second gear. Line modulator valve 220 supplies TVLM pressure to intermediate brake accumulator 256, overdrive clutch accumulator 260, and direct clutch accumulator 262. Each accumulator is shown with its plunger located as it is prior to an upshift and filled with hydraulic fluid supplied from valve 220.

Valve 258, located immediately above accumulator 256 balances the spring force against intermediate brake pressure and moves upward connecting passages 254, 261. The upper end of accumulator 256 is filled through orifice 264. The orifice establishes a constant pressure drop and flow rate into the upper end of the accumulator cylinder and moves the plunger downward at a rate consistent with the flow rate through orifice 264 against the force of the springs within the accumulator and TVLM pressure within the accumulator below the plunger. In this way, the pressure in passage 261 rises linearly and rapidly when valve 258 first opens; thereafter, pressure in brake 96 increases linearly as time increases at a lower rate determined by the flow rate through orifice 264 and the spring constant of the springs within the accumulator. Also, pressure in brake 96 has a magnitude for each unit of elapsed time that varies with TV pressure, as is explained below.

The output of valve 220 is TVLM pressure supplied to the space within each of the accumulators below the plungers. Valve 266, located at the top of the bore of line modulator valve 220, regulates by balancing TVLM pressure against the force of the inner isolator spring 268, a short spring having a relatively high spring rate that prevents contact between spools 270 and 266 when spring 268 is fully closed. When TV pressure, carried in passages 164, 224 from VFS valve 166, is approximately 6 psi or lower, spool 270 is held by the outer spring at the lower end of the valve bore, and spring 286 does not touch spool 266. In this range of TV pressure, passage 272 is vented through port 269 because feedback TVLM pressure will have forced spool 266 downward closing communication between passages 222 and 272. When TV pressure rises above 6 psi, valve 270 rises off its seat against the effect of the outer spring. Spring 268 causes valve 266 to regulate because it moves valve 266 upward causing TVLM pressure to rise by one unit for each two unit increase of TV pressure above 6 psi. In this way, line pressure is modulated according to the magnitude of TV pressure produced by VFS valve 166 in accordance with the control of the microprocessor.

Accordingly, the pressures produced by accumulators 256, 260, 262 increase linearly with time after the initial rapid rise in their output pressures following their being pressurized from passages 254, 278 and 280, respectively. The pressures produced by the accumulators are higher at a given time after their linear increase beings if TV pressure is high, and lower at that time if TV pressure is low, because TVLM pressure varies linearly with TV pressure above 6 psi.

During the upshift, TVLM pressure in line 272 remains substantially constant because fluid forced from below the accumulator plunger briefly and slightly raises the pressure force at the head of valve 266, and reopens the connection between line 272 and the vent 269 in modulator valve 220. The the pressure in line 272 falls and the opening to vent 269 closes. This lost fluid is returned to the accumulator through line 22 while the accumulator is being recharged. When the intermediate brake is to be disengaged, for example during a 2-1 downshift, the process for activating the accumulator is substantially reversed from that of the upshift. The 2-1 downshift occurs when line 254 is vented at 384 through 1-2 shift valve 228 due to the presence of SOL1 pressure and the absence of SOL2 pressure at that shift valve. Flow from the space above the plunger of accumulator 226 through orifice 275 and the constant spring rate of the accumulator springs again controls the rate at which the plunger rises within its chamber and the rate at which the accumulator cylinder below the plunger is filled with fluid from line 222 and line modulator valve 220. As the accumulator is being recharged, fluid within the accumulator cylinder above the plunger flows through one-way check valve 274, and passages 263, 254. Check valve 277 directs fluid through 2-1 downshift orifice, and the fluid is vented through 1-2 shift valve 228. Likewise, intermediate brake 96 is vented through passages 261, 254, the and shift valve 228.

Intermediate brake 96 remains engaged for third gear and fourth gear during automatic operation because 1-2 shift valve 228 connects passages 227 and 254 for any combination of states of solenoid valves 118, 190 except the first gear states.

Overdrive clutch accumulator 260 works, as accumulator 256 does, to pressurize and vent overdrive clutch 74 through passage 276 during a 3-4 upshift and 4-3 downshift. These upshifts and downshifts are initiated by selectively pressurizing and venting passage 278 through 3-4 shift valve 236, as described below.

An automatic upshift from second gear to third gear occurs after first solenoid shift valve 188 is closed by deenergizing its solenoid, and maintaining second solenoid valve 190 open, according to the schedule of FIG. 4. Line pressure continues to be directed by manual valve 160 through passage 226, 230 to 2-3 shift valve 232. Because of the absence of SOL1 pressure, valve 232 moves to the position of FIG. 5e. This opens line pressure to passage 280 through which control valve 282 at the end of direct clutch accumulator 262 is pressurized. Direct clutch 98 is thereby pressurized rapidly over a first, short portion of its engagement period, during which the clearances among the various components of the clutch are taken up. Thereafter, clutch 98 is pressurized at a linearly increasing pressure controlled by the magnitude of TVLM, the rate of flow through orifice 284, and the spring constant of accumulator 262, as has been previously described with respect to accumulator 256, until the clutch is fully engaged. Clutch 98 remains engaged during third gear and fourth gear operation because SOL1 pressure is absent; therefore, 2-3 shift valve 232 maintains open the connection between line pressure and accumulator valve 282.

An automatic 3-2 downshift occurs when solenoid valve 188 and 190 are both on. Then SOL1 pressure forces 2-3 shift valve rightward so that direct clutch 98 is drained through passages 286, valves 282, passage 280, orifice 283, shift valve 232, passage 290, 3-4 shift valve 236, and passage 292 to sump through manual valve 160. This path to sump from the direct clutch is continually open through the 3-4 shift valve 236 regardless of the presence or absence of SOL2 pressure at valve 236.

An automatic upshift from third gear to fourth gear results when solenoid valves 188 and 190 are both closed, whereby overdrive brake 74 is engaged. When this occurs, 3-4 shift valve 236 is moved by its spring to the position shown in FIG. 5d, whereby line pressure from the manual valve is directed by passage 234 through the shift valve to passage 278. Control valve 286 at the end of overdrive accumulator 260 is moved by its spring downward so that brake 74 is pressurized through passage 276 rapidly during the first, short phase of engagement of the brake during which clearances among the components of a brake are taken up. Thereafter, pressure in brake 74 rises linearly with time according to the control of TVLM pressure, the flow rate of fluid through orifice 288 and the spring constant of the accumulator, as has been described with respect to accumulator 256.

An automatic downshift from fourth gear to third gear occurs when SOL 2 pressure is applied to shift valve 236. This action moves the valve rightward opening a connection through passage 278, valve 286, passage 276 and brake 74 to the vent port at shift valve 236.

Reverse Gear

When manual valve 160 is moved to the R position, line pressure in passage 168 is directed to passages 180, through bypass loops 294, 295 to passage 292, and passage 226 is closed to the source of line pressure. Thus, forward clutch 110 is disengaged. Solenoid valve 188 is opened to connect SRV passage 186 to SOL1 passage 196, but solenoid shift valve 190 is closed. SOL1 pressure is carried in passage 244 to the end of 2-3 shift valve 232, and to the SOL1 port of 1-2 shift valve 228.

Passage 180 is connected to line pressure both when the manual valve is moved to the R position and to the 1 position. 1-R pressure forces spool 210 of the converter clutch control valve 208 downward, thereby directing regulated converter pressure through valve 208 and passage 206 to open converter clutch 54. This action assures that, if SOL3 pressure, which is limited to 50 psi, remains on while the gear selector or manual valve is in the 1 or R position, there is sufficient pressure to push spool 210 downward and open the torque converter. In this way, the torque converter is opened when 1 or R positions are selected so that the torque multiplication capacity of the torque converter is available during these high torque conditions. Passage 182 carries line pressure from valve 208 to the main regulator valve 162 when the gear selector is in the 1 and R positions. This forces spool 172 downward, closes return to the pump inlet and directs more pump output to passage 170.

Passage 300 and one-way check valves 299, 301 direct 1-R pressure also to the end of coast clutch shift valve 302. Check valve valve 299 and passage 304 carry 1-R pressure from the manual valve to manual timing valve 306.

Because SOL2 pressure is absent, 3-4 shift valve 236 is in the position shown in FIG. 5d. Therefore, when the manual valve is moved to the R position, shift valve 236 connects line pressure in passage 292 to passages 290, 310 and 318. Check valve 312 directs R pressure through orifice 314 to the end of low/reverse modular valve 316, where a pressure force acting on the valve in opposition to its spring, opens R pressure in passage 318 to low/reverse brake passage 320. Low/reverse brake 136 is the first friction element to become engaged in the process of producing reverse drive.

The 3-4 shift valve 236 also connects R pressure in passage 318 to coast clutch shift valve 302 through passage 322. Control pressure to coast clutch shift valve 302 is directed from passage 300 through the check valve 301 to passage 324. Valve 302 moves leftward against the effect of its spring due to 1-R control pressure and completes the connection from passage 322 to passage 326 and passage 330 to coast clutch 72, which is the second friction element applied during reverse drive engagement.

Manual Shift Timing Valve

When the manual valve is in the position, 1-2 shift valve 228 connects passages 310 and 332 through check valve 370. Manual timing valve 306 includes a piston 360, which is forced into contact with retaining plate 363 by SRV pressure forwarded from solenoid regulator valve 184 and maintained at a constant pressure by that valve. A second piston 330 is biased by a spring into contact also with retainer plate 363. First and second inlet passages 360, 362 supply 1-R/MAN2 pressure to timer valve 306 from passage 304. An orifice 364, located in passage 362, controls the flow rate through that passage and through valve 306 during a portion of its operation. Thereafter, when the valve opens, the higher pressure in passage 360 is directed to outlet passage 366.

In operation, first piston 360 is forced by SRV pressure into contact with plate 363. Second piston 330 is forced by the spring into contact with the plate against feedback pressure in passages 366, 368 tending to hold spool 330 rightward. This closes passage 360 but permits flow through orifice 364 and passage 366 to feedback passage 368. Ball check valve 370 and passage 332 carry R pressure from 1-2 shift valve 228 to timing valve 306, but check valve 370 closes passage 332 when it is at a higher pressure than passage 310. Therefore, R pressure in passage 332 is directed by valve 306 immediately without delay to passage 334 because R pressure forces valve spool 330 rightward and opens this connection.

The space immediately adjacent both sides of the retainer plate is pressurized through feedback passage 368. Because of the differential pressure across its ends, piston 360 immediately moves for a short period away from the plate against SRV pressure until piston 360 seats on the valve body at the left-hand extremity. After this occurs, pressure rises quickly in the annulus, within which the retainer plate is located, and piston 330 moves rightward, subject to the flow rate across orifice 364, against the spring force until it becomes seated at the right-hand end of the valve chamber. In this position, feedback passage 368 is open to passage 334 through valve 306 and passage 360 is open also to passage 334 through passages 366 and 368. The operation of the manual timing valve, therefore, delays the occurrence of Delayed 1-R/MAN2 pressure at 2-3 shift valve 232 by the period while piston 350 moves from the right-hand end of its chamber to the left-hand end plus the period while spool 330 moves rightward from plate 363 until valve 306 opens.

Valve 306 assures that whenever the vehicle operator moves manual valve 160 to the 1, 2 positions, a delay occurs before pressure from the manual valve is present at 2-3 shift valve 232. This produces a short delay, one or two seconds, before a downshift from third or fourth gear can be made into second gear. For example, when a 4-2 downshift is commanded by the vehicle operator by a manual shift to the 2 position at high speed, the transmission will dwell for a period, the period required for the manual timing valve to produce MAN2 pressure in third gear, before the downshift to the second gear is completed. In third gear drive range, coast clutch engagement produces the engine braking effect, whereas in second gear manual operation, intermediate band 102 and servo 96 produce the engine braking effect. Torque capacity of the band and servo are much lower than torque capacity of the coast clutch. By avoiding an immediate high speed 4-2 downshift, torque loads are eventually placed on band 102 are lower than otherwise they would be. Similarly, high speed downshifts into first gear are delayed to avoid the sensation of an abrupt downshift.

However, SOL2 pressure at the end of timing valve 306 increases the delay, or the absence of SOL2 pressure prevents entirely any delay in pressure being output from valve 306, depending on the magnitude of 1-R/MAN2 pressure compared to SOL2 pressure, the force developed on the spring of valve 306, and the occurrence of SOL2 pressure.

When manual timing valve 330 is positioned at the right-hand end, pressure in passage 332 is directed as pressure to passages 334, 336 to ports of the 2-3 shift valve 232. Also, R pressure is present at 2-3 shift valve 232 at the end of passage 290. As a result of pressure in passage 334, a differential pressure is developed on the spool of shift valve 232, which, regardless the effect of SOL1 pressure at the end of the spool, forces the spool rightward against the effect of the spring to connect passage 290 to passage 280. Control valve 282 at the end of the direct clutch accumulator 262 is pressurized through passage 280 and check valve 338. In this way, application of direct clutch 98 is both controlled to rise linearly with time through operation of accumulator 262 and delayed with respect to engagement of low reverse brake 136 and coast clutch 72. When the direct clutch is fully engaged, reverse drive is completed.

Forward Clutch Valve

R pressure from manual valve 160 is directed by passages 292, 310 also to the reverse port of the forward clutch valve 240. TV pressure also is directed through passage 340 from variable force solenoid valve 166 to valve 240. When TV pressure is high, as when transmission fluid is cold or the accelerator pedal is depressed substantially, valve 240 connects passages 310 and 344. This action adds flow of hydraulic fluid through valve 240 to flow from accumulator 262.

If the manual valve is in the OD or D position, and throttle pressure is high, valve 240 moves leftward against the force of its spring and opens a connection between passage 238, which contains fluid at line pressure whenever the manual valve is in the OD position, and passage 242 to the forward clutch. This action adds the flow of hydraulic fluid through valve 240 to the volume supplied through passage 226 and orifice 342 during automatic operation in forward drive. Therefore, when ambient temperature is low and the viscosity of the hydraulic fluid is relatively high, TV pressure increases the flow to the forward clutch and to the direct clutch to produce forward drive and reverse drive operation, respectively.

First Gear Manual

When first gear is produced manually by moving manual valve 160 to the 1 position, the transmission operates in the first gear by engaging forward clutch 110, low-reverse brake 136 and coast clutch 72, opening first solenoid shift valve 188, and closing second solenoid shift valve 190. In this position, the manual valve connects passages 168 and 180 through bypass loops 294 and 295, but passages 292, 226 and 318 are disconnected from line pressure 168. Converter lockup clutch 54 is disengaged and the torque converter opens through operation of the converter clutch control valve 208, main regulator valve 162 and converter regulator valve 178, as was previously described with reference to reverse drive operation.

When manual timing valve 306 times out, passage 334 communicates Delayed 1-R pressure to two ports of the 2-3 shift valve 232, which is moved rightward by the presence of SOL1 pressure at the lefthand end of the valve. This action opens communication between passages 336, 350 to a port of the 1-2 shift valve 228. SOL1 pressure in passage in passage 196 moves shift valve 228 rightward, thereby connecting passage 350 and 352. Low-reverse modulator valve 316 supplied with R/Manual 1 pressure in passage 352, is moved leftward by its spring connecting passage 352 to passage 320, through which low reverse brake 136 is engaged.

When the manual valve 160 is in the 1 position, it directs line pressure form passage 168 through passage 226, orifice 342, and passage 242 to the forward clutch 110.

The coast clutch is energized through the manual valve 160, which directs line pressure through passage 180, check valves 299, 301 and passage 324 to coast clutch shift valve 302.

Line pressure directed by manual valve 160 through passages 226, 230 is present at a port of the 2-3 shift valve 232. The presence of SOL1 pressure or Delayed 1-R pressure will have moved shift valve 232 rightward, thereby closing vent line 356 and connecting lines 230 and 358. The differential pressure on the spool of 3-4 shift valve 236 produced by pressure in passage 358 opens a connection between line passage 234 and coast clutch passage 322. Coast clutch shift valve 302 moves leftward due to the presence of 1-R pressure at its righthand end, and connects passages 322 and 326 to coast clutch 72 through orifice 374 and passage 330. Delayed 1-R pressure transmitted in passage 334 to 2-3 shift valve 232 is also passed through valve 232, passage 340, 1-2 shift valve 228 and passage 352 to low-reverse modulator 316. Low-reverse brake 136 is pressurized from valve 316, as is described above.

Second Gear Manual

A manual shift to second gear results when the gear selector manual valve 160 is moved to the 2 position and both shift solenoid valves 188 and 190 are turned on. In this position, the manual valve connects pressure in passage 168 to passages 226, 372 and disconnects passages 180, 292, 318 from line pressure. Forward clutch 110 is pressurized, as it is for each of the four forward gears, directly from the manual valve through passages 226, 242 and orifice 342.

The presence of SOL2 pressure at the end of 3-4 shift valve 236 moves the valve rightward to open the connection between passage 234, which receives line pressure through passage 226, and passage 322, which transmits line pressure from shift valve 236 to coast clutch valve 302. Manual valve 160 directs MAN2 pressure through passages 372, direction valve 299, passage 300, direction valve 301 and passage 324 to the control end of the coast clutch valve. The presence of the control pressure at valve 302 opens a connection between passages 322, 326 and directs coast clutch pressure through orifice 374, and passage 330 to coast clutch 72.

Whenever coast clutch solenoid valve 194 is on, SRV pressure is connected through valve 194 to passage 202 and direction valve 301 is pressurized, thereby closing passage 300 and pressurizing the control port of coast clutch valve 302 through passage 324. This action, therefore, engages the coast clutch by completing a connection between passages 322 and 326 regardless of the state of the manual valve.

MAN2 pressure is directed from manual valve 160 through passage 372, direction valve 299 an d passage 304 to passages 360 and 362, which lead to manual timing valve 306. When the delay period of the valve expires, MAN2 pressure is connected through the valve and passages 334, 336 to the 2-3 shift valve 232. MAN2 pressure develops a differential pressure present at that shift valve, opens passage 230 to passage 358, which is closed at 3-4 shift valve 236, and directs MAN2 pressure through line 350 to 1-2 shift valve 228. The 1-2 manual transition valve 250, biased upward by its spring because of the absence of low-reverse brake pressure in passage 370 and at its control port, directs MAN2 pressure to passage 252. MAN2 pressure adds to the effect of the spring at shift valve 228 and works in opposition to SOL1 pressure to move shift valve 228 leftward, thereby closing the connection between passages 350, 352 and opening a connection between passages 350, 380. MAN2 pressure is directed through orifices 382, 383 to the intermediate servo 96. Orifices 382, 383 delay engagement of servo 97 so that intermediate brake 96 is engaged shortly before servo 97, actuates band 102 and holds drum 100 against rotation. With the 1-2 shift valve so disposed, line pressure in passages 226, 227 and present at shift valve 228 is connected by passage 254 to the control valve at the end of intermediate clutch accumulator 256, by means of which passage 260 and intermediate brake 96 are pressurized in accordance with the technique described above. The delay in applying servo 97 and band 102 until after brake 96 is applied assures that engine torque is not carried by band 100.

A manual downshift to first gear from second gear occurs after MAN2 pressure is removed from the control end of the 1-2 shift valve. This causes shift valve 228 to move rightward thereby closing the connection between passages 350 and 380 to the intermediate servo 96, connecting passages 350 and 352 to low-reverse brake 136 through the low reverse modulator valve 316, disconnecting passages 226 and 254, and connecting passage 254 to vent port 384. In this way, intermediate brake 96 is vented and drained through accumulator control valve 258. The fluid above the plunger of accumulator 256 passes through the 2-1 downshift orifice near ball check valve 277 in passage 254 and eventually to vent 384.

Third Gear Manual

When the manual valve is moved to the OD position and the drive button is depressed, the transmission will produce automatic shifts among the first three gears in the manner previously described with respect to automatic operation. However, in this case, unlike overdrive operation, third gear has engine braking effect due to engagement of the coast clutch. Intermediate brake 96, direct clutch 98, and forward clutch 110 are applied as described above with respect to overdrive operation. To produce third gear, second solenoid shift valve 190 is on and first solenoid shift valve 188 is off. The 3-4 shift vale 236, moved rightward by SOl2 pressure, opens a connection between passage 234 and coast clutch pressure in passage 322.

Coast Clutch Shift Valve and Solenoid Valve

When a command is made for third gear operation and the manual valve is in the overdrive position with the drive range button depressed, coast clutch solenoid valve 194 is on and it directs SOL4 pressure through passage 202. Check valve 301 pressurizes the control port of coast clutch shift valve 302. This moves shift valve 302 leftward and connects coast clutch pressure in passage 322 to passage 326, through which coast clutch 72 is engaged, whereby the transmission is disposed for operation in third gear with engine braking.

To upshift from manual third gear to fourth gear coast clutch 72 is disengaged and overdrive clutch 74 is engaged. To disengage the coast clutch, 3-4 shift valve 236 moves leftward when SOL2 pressure is removed, thereby closing the connection between line pressure in line 234 and passage 322 and connecting passages 234 and 278. Overdrive brake 74 is engaged through operation of accumulator 260. In this way, coast clutch shift valve 302 will not supply pressure to the coast clutch even if SOL4 pressure is available at the control port of coast clutch passage 326. In making the upshift from third gear manual to fourth gear, SOL4 pressure is removed permitting the valve 390 to close passage 322 and to connect coast clutch 22 to vent port 390.

Having described a preferred embodiment of my invention, what I claim and desire to secure by U.S. Letters Patent is:

1. A system for controlling the operation of a first friction element, comprising:
   a source of regulated line fluid pressure;
   manual valve means moveable among positions selected by an operator for connecting said line pressure source to a first port of the manual valve means and for producing a third control pressure, in accordance with the position of the manual valve means;
   a first control valve means operated by a solenoid for producing a first control pressure;
   first shift valve means connected to the first control pressure for connecting the first port of the manual valve means to a first output port of the first shift valve means according to the control of the first control pressure;
   second control valve means operated by a solenoid for producing a second control pressure;
   second shift valve means connected to the second control pressure for connecting the first output port of the first shift valve means to the first friction element in accordance with the control of the second control pressure
   means for directing alternately the third control pressure or the second control pressure to the second shift valve; and
   the second shift valve means is connected to the output of the directing means for connecting the output port of the first shift valve means to the first friction element in accordance with the control of the direction means output.

2. The system of claim 1 wherein said second shift valve means further includes means for alternately pressurizing and venting the first friction element in accordance with the control of the second control pressure.

3. The system of claim 1 wherein the second control pressure is high or low pressure whose magnitude varies according to the energized or deenergized state of the solenoid that operates the second control valve.

4. The system of claim 1 wherein the manual valve means further includes means for connecting said line pressure source to a third control pressure output of said manual valve means when the manual valve means is located at a manually selected gear position.

5. The system of claim 1 further comprising
   a second friction element; and
   wherein the first shift valve means includes a second output port connected to the second friction element and means for connecting the first output port of the manual valve means to said second output port according to control of the first control pressure.

6. The system of claim 5 wherein the first shift valve means further includes means for alternately pressurizing and venting the second friction element in accordance with the control of the first control pressure.

7. A system for controlling the operation of a first friction element, comprising:
   a source of regulated line fluid pressure;
   manual valve means moveable among positions selected by an operator for connecting said line pressure source to a first output port of the manual valve means and for producing concurrently a third control pressure, in accordance with the position of the manual valve means;
   a first control valve means operated by a solenoid for producing a first control pressure;
   first shift valve means connected to the first control pressure for connecting the first output port of the manual valve means to a first output port of the first shift valve means according to the control of the first control pressure;
   second shift valve means connected to the third control pressure for connecting the first output port of the first shift valve means to the first friction element in accordance with the control of the third control pressure.

8. A system for controlling the operation of first and second friction elements, comprising:
   a source of regulated line fluid pressure;
   manual valve means moveable among positions selected by an operator for connecting said line pressure source to a first port of the manual valve means in accordance with the position of the manual valve means;
   a first control valve means operated by a solenoid for producing a first control pressure;
   first shift valve means connected to the first control pressure for connecting the first port of the manual valve means to a first output port of the first shift valve means and for connecting the first port of the manual valve means to the second friction element according to the control of the first control pressure;

second control valve means operated by a solenoid for producing a second control pressure; and second shift valve means connected to the second control pressure for connecting the first output port of the first shift valve means to the first friction element according to the control of the second control pressure.

9. A method for controlling the operation of a first friction element in an automatic transmission that includes a source of regulated line fluid pressure, a manual valve moveable among positions selected by an operator comprising:

connecting the line pressure source to a first output port of the manual valve in accordance with the position of the manual valve;

producing a high pressure state and low pressure state of a first control pressure;

connecting the first port of the manual valve to a first output port of the first shift valve means according to the state of the first control pressure;

producing a high pressure state of a second control pressure corresponding to manual valve positions at which the gears are manually selected, and a low pressure state of a second control pressure corresponding to manual valve positions at which the gears are automatically selected; and connecting the first output port of the first shift valve means to the first friction element according to the control of the second pressure.

10. A method for controlling the operation of first and second friction element in an automatic transmission that includes a source of regulated line fluid pressure, a manual valve moveable among positions selected by an operator comprising:

connecting the line pressure source to a first output port of the manual valve in accordance with the position of the manual valve;

producing a high pressure state and low pressure state of a first control pressure;

connecting the first port of the manual valve to a first output port of the first shift valve means and to the second friction element according to the state of the first control pressure;

producing a high pressure state of a second control pressure corresponding to manual valve positions at which the gears are manually selected, and a low pressure state of a second control pressure corresponding to manual valve positions at which the gears are automatically selected; and connecting the first output port of the first shift valve means to the first friction element according to the control of the second control pressure.

11. A method for controlling the operation of first and second friction element in an automatic transmission that includes a source of regulated line fluid pressure, a manual valve moveable among positions selected by an operator comprising:

connecting the line pressure source to a first output port of the manual valve in accordance with the position of the manual valve;

producing a high pressure state and low pressure state of a first control pressure;

connecting the first port of the manual valve to a first output port of the first shift valve means and to the second friction element according to the state of the first control pressure;

producing a high pressure state of a second control pressure corresponding to manual valve positions at which the gears are manually selected, and a low pressure state of a second control pressure corresponding to manual valve positions at which the gears are automatically selected; and producing a variable third control pressure corresponding to a requirement to pressurize the first friction element;

directing alternately the second control pressure and the third control pressure to the second shift valve; and connecting the first output port of the first shift valve means to the first friction element according to the control of the second or third control pressure directed to the second shift valve.

12. The system of claim 10 wherein said first shift valve means further includes means for alternately pressurizing and venting the second friction element in accordance with the control of the first control pressure.

* * * * *